United States Patent
Rommelspacher et al.

(10) Patent No.: US 12,466,824 B2
(45) Date of Patent: Nov. 11, 2025

(54) STABLE POLYMORPHIC FORM OF 6-FLUORO-9-METHYL-9H-β-CARBOLINE AND USES THEREOF

(71) Applicant: AudioCure Pharma GmbH, Berlin (DE)

(72) Inventors: Hans Rommelspacher, Berlin (DE); Tomasz Zygmunt, Berlin (DE); Reimar Schlingensiepen, Berlin (DE)

(73) Assignee: AudioCure Pharma GmbH, Berlin (DE)

( * ) Notice: Subject to any disclaimer, the term of this patent is extended or adjusted under 35 U.S.C. 154(b) by 948 days.

(21) Appl. No.: 17/633,544

(22) PCT Filed: Aug. 7, 2020

(86) PCT No.: PCT/EP2020/072328
§ 371 (c)(1),
(2) Date: Feb. 7, 2022

(87) PCT Pub. No.: WO2021/028365
PCT Pub. Date: Feb. 18, 2021

(65) Prior Publication Data
US 2022/0289741 A1    Sep. 15, 2022

(30) Foreign Application Priority Data

Aug. 9, 2019 (EP) ...................................... 19191150

(51) Int. Cl.
*C07D 471/04* (2006.01)
*A61P 27/16* (2006.01)

(52) U.S. Cl.
CPC ............ *C07D 471/04* (2013.01); *A61P 27/16* (2018.01); *C07B 2200/13* (2013.01)

(58) Field of Classification Search
CPC .................................................. C07D 471/04
See application file for complete search history.

(56) References Cited

U.S. PATENT DOCUMENTS

| | | |
|---|---|---|
| 9,630,964 B2 | 4/2017 | Rommelspacher et al. |
| 2004/0038970 A1 | 2/2004 | Thurieau et al. |
| 2010/0143474 A1 | 6/2010 | Rommelspacher |
| 2013/0028958 A1 | 1/2013 | Rommelspacher |

FOREIGN PATENT DOCUMENTS

| | | | |
|---|---|---|---|
| DE | 10 2007 009264 A1 | 8/2008 | |
| WO | WO 2011/079841 A1 | 7/2011 | |
| WO | WO2015/044434 * | 4/2015 | ........... C07D 471/04 |
| WO | WO 2015/044434 A2 | 4/2015 | |

OTHER PUBLICATIONS

Erdemir et al.; "Polymorph selection: the role of nucleation, crystal growth and molecular modeling" Curr. Opin. Drug Discov. Dev. (2007) 10(6):746-755.
International Search Report and Written Opinion mailed Nov. 10, 2020 for PCT/EP2020/072328, dated Aug. 7, 2020.
International Preliminary Report on Patentability issued Feb. 8, 2022 for PCT/EP2020/072328, dated Aug. 7, 2020.

* cited by examiner

*Primary Examiner* — Paul V Ward
(74) *Attorney, Agent, or Firm* — Knobbe, Martens, Olson & Bear, LLP

(57) ABSTRACT

The present invention relates to a stable crystalline polymorphic form of 6-fluoro-9-methyl-9H-β-carboline of formula (I) a method for preparation of said crystalline polymorphic form of 6-fluoro-9-methyl-9H-β-carboline, and a pharmaceutical composition comprising said crystalline polymorphic form of 6-fluoro-9-methyl-9H-β-carboline. Furthermore, the present invention relates to the use of said stable crystalline polymorphic form and the use of the pharmaceutical composition comprising said stable crystalline polymorphic form in the treatment and/or prophylaxis of hearing damage, vertigo or vestibular disorders.

(I)

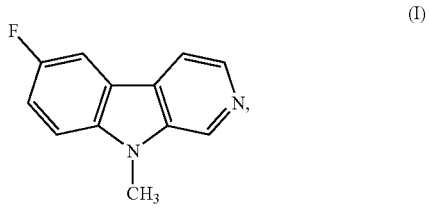

20 Claims, 26 Drawing Sheets

Figure 1
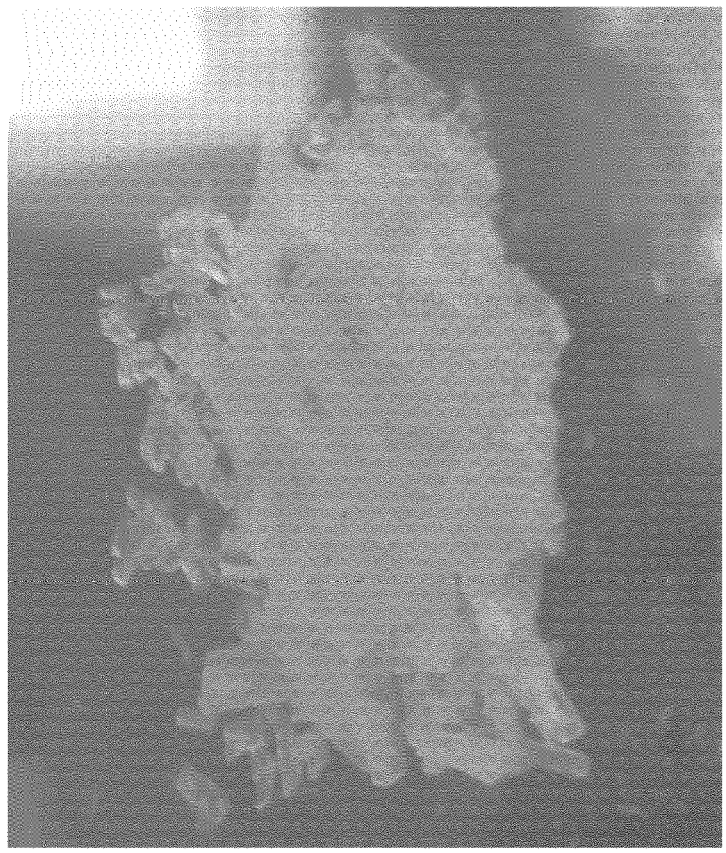
B) crystals of polymorph B
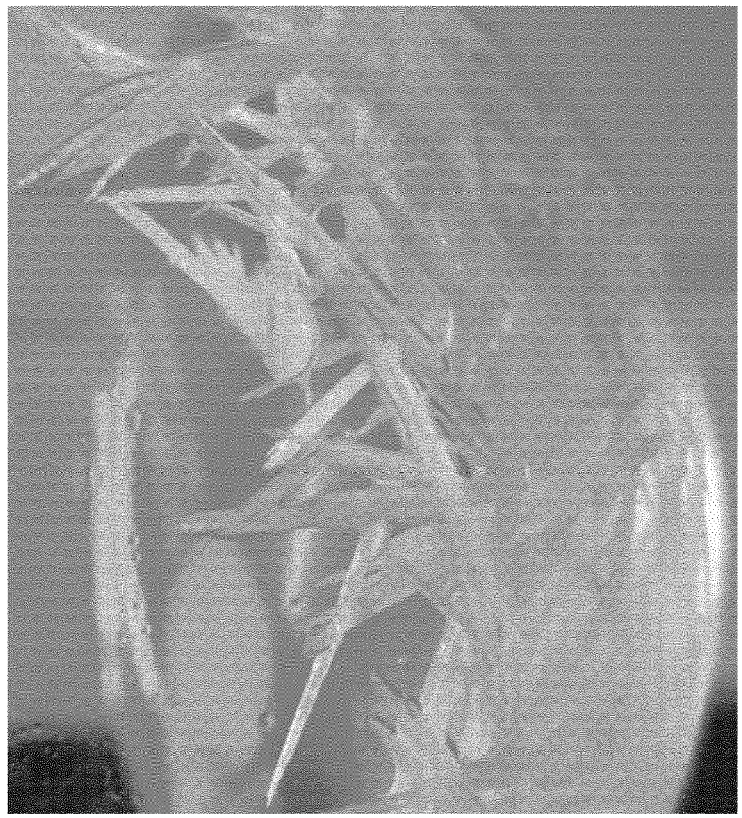
A) crystals of polymorph A A) polymorph A

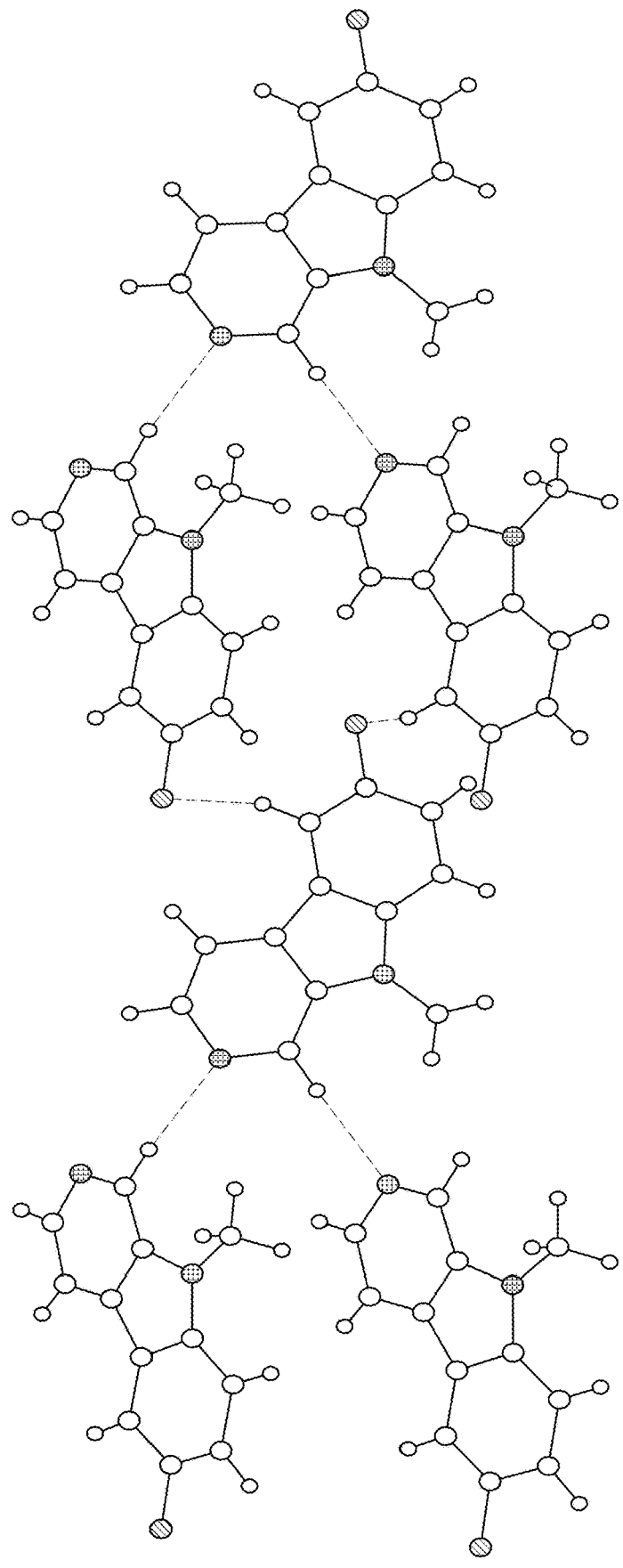

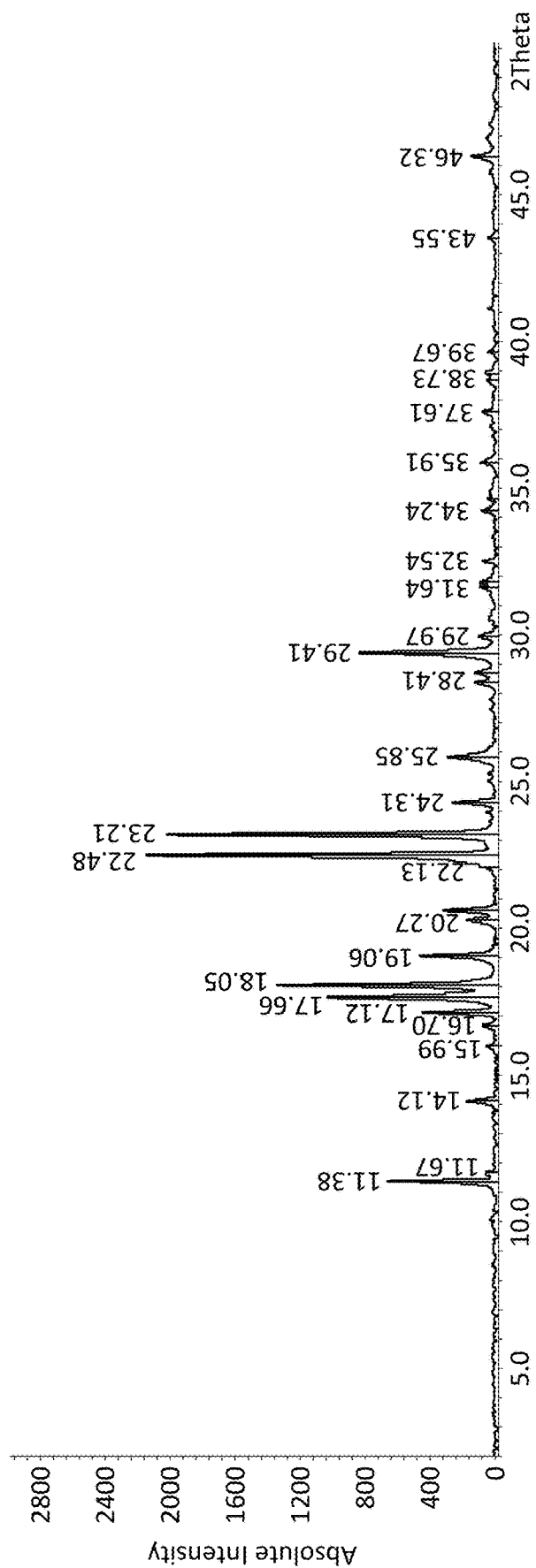

B) Melting curve of polymorph B

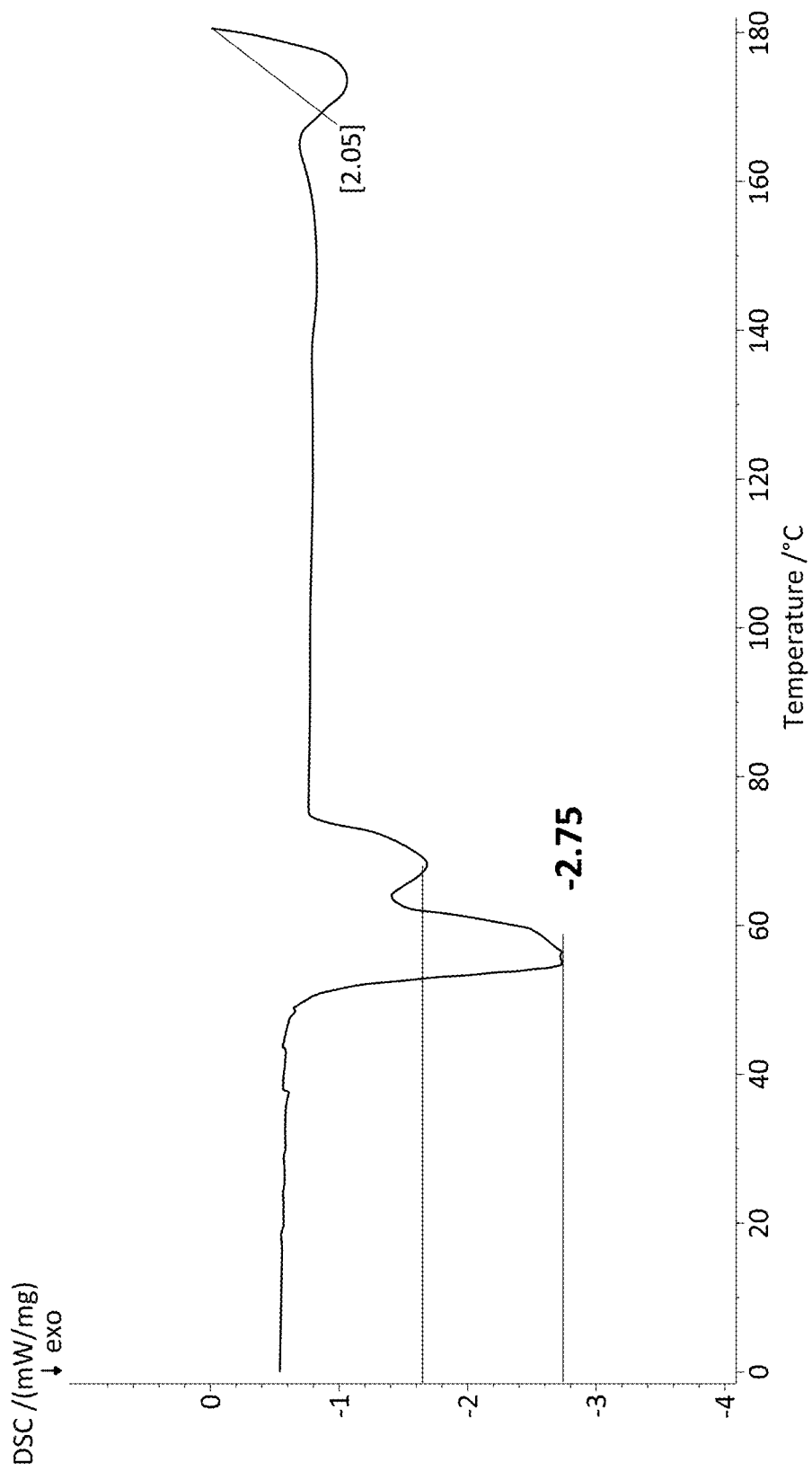

B) polymorph B

A) ssNMR of polymorph A

B) ssNMR of polymorph B

STABLE POLYMORPHIC FORM OF 6-FLUORO-9-METHYL-9H-β-CARBOLINE AND USES THEREOF

The present invention relates to a stable crystalline polymorphic form of 6-fluoro-9-methyl-9H-β-carboline of formula (I), a method for preparation of said crystalline polymorphic form of 6-fluoro-9-methyl-9H-β-carboline, and a pharmaceutical composition comprising said crystalline polymorphic form of 6-fluoro-9-methyl-9H-β-carboline. Furthermore, the present invention relates to the use of said stable crystalline polymorphic form and the use of the pharmaceutical composition comprising said stable crystalline polymorphic form in the treatment and/or prophylaxis of hearing damage, vertigo or vestibular disorders.

BACKGROUND OF THE INVENTION

Polymorphism is the ability of a chemical to exist in more than one distinct crystalline form having different arrangements of molecules in the crystal lattice. Although polymorphs of the same species are chemically identical, each polymorph has its own unique combinations of chemical, mechanical, thermal and physical properties. The variation in the physicochemical properties of different crystal forms makes polymorphism a potentially important issue for pharmaceutical companies (Erdemir et al.; Curr. Opin. Drug Discov. Dev. 2007, 746-755). Difficulties and inconsistencies encountered in product performance and development can be attributed to polymorphism, and it is a common agreement within the pharmaceutical industry that polymorphism is a crucial aspect to consider when developing new drug candidates. Active pharmaceutical ingredients (API) are frequently delivered to patients in the solid state as solid forms offer convenience, physical and chemical stability, ease of product handling and low manufacturing costs. Because each solid form displays unique physicochemical properties, understanding and controlling the solid-state properties of an API is extremely important in the drug development process. Unintentional production of the wrong polymorph at the crystallization stage can result in pharmaceutical dosage forms that are either ineffective at a designated dose at the given application form or have the potential to become toxic. For these reasons regulatory agencies require pharmaceutical companies to control the crystallization process so that the desired polymorph is produced continually and has encouraged the application of process analytical technologies to crystallization process development.

Recrystallization from solution can be envisioned as a self-assembly process in which randomly organized molecules dissolved in an oversaturated solvent or solvent mixture come together to form an ordered three-dimensional molecular array with a periodic repeating pattern. Crystallization is vital to many processes occurring in nature and in the manufacturing of a wide range of materials. The quality of a crystalline product is usually judged by four main criteria: crystal size, -purity, -morphology, and crystal structure. Control of crystal morphology is essential in many applications because the particle habit can have a huge impact on post-crystallization processes. For the development of an API, it is vital to produce a specific polymorph to assure the bioavailability and stability of a drug substance in the final dosage form.

The German patent application (DE 10 2007 009264 A1) discloses 9-alkyl-β-carbolines that due to their neuroprotective effect can be used for therapy and/or prophylaxis of movement disorders and/or neurologic diseases like for instance Alzheimer or Parkinson.

The US patent application US 2004/038970 A1 discloses the use of 3-substituted 2,3,4,9-tetrahydro-1H-β-carbolines as active agents in the treatment of a variety of medical indications, including tinnitus. However, the substitution pattern of this group of β-carbolines differ structurally considerably from the substitution pattern of 6-fluoro-9-methyl-β-carboline.

The international patent application (WO 2011/079841 A1) discloses β-carbolines, preferably 9-alkyl-β-carbolines, preparation method thereof, and pharmaceutical composition containing said β-carbolines. Furthermore, this PCT application relates to the use of said β-carbolines for the prophylaxis and treatment of hearing loss, tinnitus, acoustic shocks, vertigo and equilibrium disorders.

The international patent application (WO 2015/044434 A2) discloses fluoro-9-methyl-β-carbolines including 6-fluoro-9-methyl-9H-β-carboline, preparation method thereof, and pharmaceutical compositions containing fluoro-9-methyl-β-carbolines. In addition, this PCT application discloses medical use of fluoro-9-methyl-β-carbolines for treatment of acute and chronic ear diseases and hearing damages, dizziness and balance disturbances.

However, the international patent application (WO 2015/044434 A2) discloses 6-fluoro-9-methyl-β-carboline and does not describe any crystalline or polymorphic form thereof.

It is the objective of the present invention to provide a stable crystalline polymorphic form of 6-fluoro-9-methyl-β-carboline especially as active ingredient for the preparation of pharmaceutical compositions, and to provide such stable pharmaceutical compositions comprising said stable crystalline polymorphic form of 6-fluoro-9-methyl-β-carboline as well as uses thereof and a method for preparation of that stable polymorphic form.

This objective of the present invention is solved by the teachings of the independent claims. Further advantageous features, aspects and details of the invention are evident from the dependent claims, the description, the figures, and the examples of the present application.

SUMMARY OF INVENTION

In the present invention several specific crystalline polymorphic forms of 6-fluoro-9-methyl-β-carboline, also named herein 6-FMC, are firstly provided and the technical features thereof are also disclosed. However, surprisingly only one of these specific crystalline polymorphic forms is sufficiently stable and thus suitable for the preparation of pharmaceutical compositions. All other polymorphic forms cannot be used for pharmaceutical formulations due to their instability.

The compound 6-fluoro-9-methyl-β-carboline (6-FMC) exists in at least four polymorphic forms denominated polymorph A, B, C, and T. In practice, 6-FMC is applied as a suspension to reach therapeutic concentrations in the target tissue. It is vital to produce a specific polymorph to assure the bioavailability and stability of the drug substance in the finished dosage form. Therefore, the chemical, mechanical, thermal and physical properties of each polymorph both in powder form and as part of the formulation are characterized. Conspicuous differences between the polymorphs were found. The melting points differed and recrystallisation yielded orthorhombic forms for polymorph A and monoclinic forms in the case of polymorph B. The spectra of x-ray powder diffractometry were clearly different as well as the spectra of ssNMR and infrared spectroscopy. The polymorphs C and T were hard to isolate in pure form due to their rapid decomposition so that clean spectra of these polymorphs were challenging to obtain. Investigations of the stability of the polymorphs revealed that polymorphic forms A, C and T are not suitable for the manufacturing of a pharmaceutical formulation, while polymorph A is not stable, but can be converted into polymorph B under the conditions disclosed herein. Surprisingly, the polymorphic form B was the only polymorph which is sufficiently stable and suitable for the preparation of a pharmaceutical formulation containing particles of crystalline 6-fluoro-9-methyl-β-carboline of polymorphic form B. The polymorphic forms A, C, and T are not even sufficiently stable under normal storage conditions for pharmaceutical formulations at room temperature so that polymorphic forms A, C, and T of 6-fluoro-9-methyl-β-carboline cannot be used as crystalline active ingredient in pharmaceutical formulations for the treatment of the inner ear. Such pharmaceutical formulations are preferably liposomal formulations, ointments, suspensions, gels and emulsions, wherein the polymorphic form B of the 6-fluoro-9-methyl-β-carboline is present in crystalline form or micronized form, preferably as microparticles or nanoparticles.

Thus, several stability tests were performed with the polymorphic form B of the 6-fluoro-9-methyl-β-carboline and it is proven herein that polymorph B is very stable and the perfect form for the intended pharmaceutical formulations. Only under drastic conditions as disclosed herein, polymorph B could be converted into polymorph A. A conversion of polymorph B into polymorph A could be achieved by extraction with supercritical carbon dioxide as well as by vacuum sublimation, while a spontaneous conversion of polymorph A into B happens in the formulation immediately after mixing. The reverse process has never been observed. Furthermore, the third polymorph C and the fourth polymorph T decompose even during the manufacture of a pharmaceutical formulation. Any conversion of polymorph B into polymorph C or into polymorph T could not be detected, not even under such drastic conditions like the exposure to supercritical carbon dioxide or vacuum sublimation or extreme heating.

Therefore, the present application is directed to the polymorphic form B of 6-fluoro-9-methyl-β-carboline as the only stable polymorphic form of 6-fluoro-9-methyl-β-carboline which is suitable for the preparation of the pharmaceutical formulations as disclosed herein.

DESCRIPTION OF THE INVENTION

Accordingly, the present invention relates to the crystalline polymorphic form of 6-fluoro-9-methyl-9H-β-carboline of the formula (I)

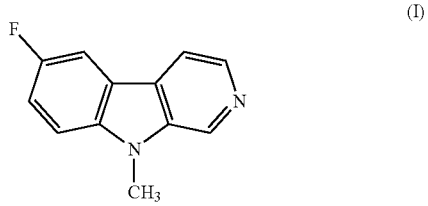

(I)

wherein the crystalline polymorphic form of 6-fluoro-9-methyl-9H-β-carboline (referred herein as polymorph B or polymorphic form B) has the X-ray powder diffraction pattern comprising 2-theta angle values of 11.3, 17.1, 17.6, 18.0, 22.5, 23.2, and 29.4 degrees with a deviation ±0.2 degree.

Preferred, this crystalline polymorphic form B of 6-fluoro-9-methyl-9H-β-carboline has the X-ray powder diffraction pattern comprising 2-theta angle values of 11.3, 14.1, 17.1, 17.6, 18.0, 19.0, 20.3, 20.6, 22.5, 23.2, 24.3, 25.8, and 29.4 degrees with a deviation ±0.2 degree. More precisely, each indicated value has the deviation ±0.2 degree and can be written as follows: 11.3±0.2 degree, 14.1±0.2 degree, 17.1±0.2 degree, 17.6±0.2 degree, 18.0±0.2 degree, 19.0±0.2 degree, 20.3±0.2 degree, 20.6±0.2 degree, 22.5±0.2 degree, 23.2±0.2 degree, 24.3±0.2 degree, 25.8±0.2 degree, and 29.4±0.2 degree. Preferably the deviation is only ±0.15 degree and more preferably only ±0.1 degree.

In one embodiment, the crystalline polymorphic form of 6-fluoro-9-methyl-9H-β-carboline (polymorph B) is in a monoclinic form having a space group of $p2_1/c$, wherein one molecule of 6-fluoro-9-methyl-9H-β-carboline is in an asymmetric unit cell having unit cell dimension of a=3.85±0.1 Å, b=17.32±0.1 Å, c=13.77±0.1 Å, α=90±3°, β=91±3° and γ=90±3°.

In one embodiment, solid state $^{13}$C-NMR spectrum of said crystalline polymorphic form (polymorph B) of 6-fluoro-9-methyl-9H-β-carboline comprises peaks at 28.6, 107.3, 110.2, 111.6, 112.8, 116.6, 121.5, 126.2, 138.0, 155.5, 156.1, 156.7, 157.1, 157.2, 157.7, 158.1, and 158.4 ppm with a deviation ±1 ppm as shown in FIG. 8B. Thus, comprises peaks at 28.6±1 ppm, 107.3±1 ppm, 110.2±1 ppm, 111.6±1 ppm, 112.8±1 ppm, 116.6±1 ppm, 121.5±1 ppm, 126.2±1 ppm, 138.0±1 ppm, 155.5±1 ppm, 156.1±1 ppm, 156.7±1 ppm, 157.1±1 ppm, 157.2±1 ppm, 157.7±1 ppm, 158.1±1 ppm, and 158.4±1 ppm. Preferably the deviation is only ±0.5 ppm and more preferably only ±0.2 ppm.

In one embodiment, the crystalline polymorphic form B of 6-fluoro-9-methyl-9H-β-carboline according to the invention has a melting point of 123±1° C.

More preferred, IR-spectrum of said crystalline polymorphic form B of 6-fluoro-9-methyl-9H-β-carboline comprises peaks at 803.27, 819.54, 852.30, 864.13, 893.22, 1024.99, 1126.71, 1148.77, 1183.98, 1272.31, 1283.82, 1333.10, 1362.06, 1426.98, 1448.53, 1481.82, 1554.80, and 1578.94 cm$^{-1}$ with a deviation ±5 cm$^{-1}$. Preferably the deviation is only ±4 cm$^{-1}$ and more preferably only ±3 cm$^{-1}$.

Most preferred, the IR-spectrum of said crystalline polymorphic form comprises peaks at 426.62, 524.31, 558.12, 604.22, 636.09, 704.73, 729.05, 742.59, 803.27, 819.54, 852.30, 864.13, 893.22, 1024.99, 1126.71, 1148.77, 1183.98, 1272.31, 1283.82, 1333.10, 1362.06, 1426.98, 1448.53, 1481.82, 1554.80, and 1578.94 cm$^{-1}$ with a deviation ±5 cm$^{-1}$.

In the present application, another crystalline polymorphic form of 6-fluoro-9-methyl-9H-β-carboline (hereafter, polymorph A) has been identified as shown in FIG. 1A. However, this polymorphic form is not sufficiently stable and is disclosed herein as a reference example but is not part of the present invention. The crystalline polymorphic form of 6-fluoro-9-methyl-9H-β-carboline (polymorph A) was fully characterized, while the polymorphic forms C and T are so instable that even full characterization was hardly possible. This crystalline polymorphic form A is in an orthorhombic form and has a space group of $p2_12_12_1$, one molecule of 6-fluoro-9-methyl-9H-β-carboline in an unit cell and unit cell dimension of a=5.90±0.1 Å, b=10.35±0.1 Å, c=15.46±0.1 Å, α=90±3°, β=90±3° and γ=90±3°.

The crystal structure of polymorph A (FIG. 3A) was characterized in some detail by X-ray crystallography. This polymorph crystallizes in an orthorhombic form within a space group $p2_12_12_1$. Unit cell dimensions are a=5.8986 (1) Å, alpha=90°; b=10.3506 (3) Å, beta=90°; c=15.4572 (5) Å, gamma=90°. As shown in FIG. 2A), the 6-FMC molecules are in multidimensional layers of pi-stacked molecules and orthogonal T-stacked molecules. It also shows clearly that there are no hydrates, solvates or salt-based counter ions present in the structure.

The picture of the formula confirmed the identity of the compound as disclosed.

Said polymorphic form A has the X-ray powder diffraction pattern comprising 2-theta angle values of 11.9, 13.8, 16.5, 20.0, 23.8, 24.0, 25.6, 26.2, 26.7, and 28.1 degrees with a deviation ±0.2 degree. Especially distinctive are the signals comprising 2-theta angle values of 11.9, 16.5, 26.7 and 28.1.

The melting points were measured in an open capillary Buechi M565 melting point apparatus. Heating rate was slowed down at 100° C. to 1 centigrade per minute to determine the melting point more accurately. The uncorrected melting point turned out to be ~125° C.+/−2° C. The melting point was confirmed by differential scanning calorimetry (DSC). The heating and cooling curves were recorded by differential scanning calorimetry (DSC; Netzsch DSC 204 F1) (FIG. 5A). The melting point was confirmed by DSC heating. The cooling curve demonstrated a broad range between 65° C. and 45° C. (FIG. 6A).

Solid state $^{13}$C-NMR spectrum of said crystalline polymorphic form comprises peaks at 28.6, 103, 111, 113, 114, 118, 124, 130, 133, 135 and 155-158 (many C—F peaks) ppm with a deviation ±1 ppm. (FIG. 8A). FIG. 8A shows ssNMR of polymorph A, and FIG. 8B shows ssNMR of the polymorph B of 6-fluoro-9-methyl-9H-β-carboline. These spectra demonstrate clear differences between the two polymorphs A and B.

Stability of Inventive Polymorph B Compared to Other Crystalline Forms

The extent of conversion generally depends on the relative stability of the polymorphs, kinetic barriers to phase conversion, and applied stress. Nonetheless, phase conversion generally is not of serious concern, provided that the conversion occurs consistently, as a part of a validated manufacturing process where critical manufacturing process variables are well understood and controlled.

The most thermodynamically stable polymorphic form of a drug substance is often chosen during development based on the minimal potential for conversion to another polymorphic form and on its greater chemical stability.

In the present application, the stability of the inventive polymorph of 6-fluoro-9-methyl-9H-β-carboline (polymorph B) is tested and compared to other polymorphs of 6-fluoro-9-methyl-9H-β-carboline (polymorphs A, C and T) as a reference.

It was tried to convert the inventive polymorph of 6-fluoro-9-methyl-9H-β-carboline (polymorph B) into another polymorphic form (such as polymorph A) under various thermal conditions as described in Example 3.

The crystalline polymorphic form of 6-fluoro-9-methyl-9H-β-carboline (polymorph B) was dissolved in an organic solvent and said mixture was heated. As described in Example 3, it failed to fully convert the crystalline polymorphic form (polymorph B) to another form (here polymorph A).

The thermal stability of the inventive polymorphic form compared to another polymorphic form is unexpected and technically advantageous, in particular, for the pharmaceutical process and regulation. The search results indicate that at room temperature and even below room temperature the polymorphic form A converts partially or fully into a thermally more stable form which is the polymorphic form B. This conversion can be accelerated by elevating the temperature. This thermal instability of polymorphic form A is a disadvantage which renders this polymorph unsuitable for pharmaceutical purposes.

The full conversion of the inventive polymorphic form (polymorph B) into polymorph A could be achieved only under drastic conditions, e.g. in supercritical $CO_2$ as described in Example 4. The cylinder of the apparatus in which supercritical $CO_2$ had been introduced was loaded with polymorph B (FIG. 9A) and heated to 60° C. and a pressure of 35 kPa. The time amounted to 2.5 hrs during which the API dissolved completely in the supercritical $CO_2$. The spectrum of the final product is shown in FIG. 9B. It is quite obvious that a conversion happened of polymorph B in polymorph A. The powder was white (FIG. 9C). However, it is clear that such conditions are not applied during the preparation of the pharmaceutical formulations of interest. Moreover, the fact that polymorph B can only under extreme conditions be converted into another polymorphic form demonstrates that polymorph B is absolutely stable under the conditions the pharmaceutical formulations of interest are manufactured, stored and applied.

Various dissolution/crystallization conditions have been applied to try to convert polymorph B into polymorph A. As mentioned above, only with sophisticated procedures polymorph B could be fully converted into polymorph A (Example 4). Polymorphic forms of a drug substance can undergo phase conversion when exposed to a range of manufacturing processes, such as drying, milling, micronization, wet granulation, spray-drying, and compaction. Exposure to environmental conditions such as humidity and temperature can also induce polymorph conversion. Therefore, polymorph A is unstable and thus not suited for pharmaceutical processes, while polymorph B was stable under all these conditions including drying, milling, micronization, wet granulation, spray-drying, and compaction.

In contrary to the polymorph A, the inventive crystalline (polymorph B) is very stable and thus no conversion occurs when exposed to a range of manufacturing and formulation processes. This is an unexpected technical advantage.

Third polymorphic form of 6-fluoro-9-methyl-9H-β-carboline, polymorph C, was obtained after recrystallization of polymorph B in a ternary solvent mixture of heptane, ethanol and water as described in Example 7 and shown in FIG. 15. The obtained polymorph C was very unstable under standard conditions and within a couple of weeks at room temperature, relative humidity of 40% to 60%, and atmospheric pressure polymorph C was completely converted into polymorph B.

By dissolving the 6-fluoro-9-methyl-β-carboline in acidic water and titrating the solution to pH 12 a fourth polymorphic form of 6-fluoro-9-methyl-9H-β-carboline, polymorph B appeared as the less stable polymorphic form of the 6-fluoro-9-methyl-β-carboline. Already after a couple of days at standard conditions (room temperature, relative humidity of 40% to 60%, and atmospheric pressure) no polymorph T could be detected. This rapid disappearance of polymorph T made the full characterization quite challenging. However, it can be stated that none of the polymorphs C and T is a hydrate or a salt form. The isolation of said polymorph T failed. Upon storing polymorph A in aqueous media, conversion to polymorph B and signals of polymorph T are observed. At least the characteristic 2-theta values of the polymorph T could be determined by subtraction of the signals belonging to polymorph B from a mixed diffractogram. Characteristic pattern of the X-ray powder diffraction is shown in FIG. 16. All these findings clearly emphasize that polymorph B represents the most stable polymorph of 6-FMC and is actually the only polymorph suitable for manufacturing the desired pharmaceutical formulations.

Micronization and Polymorph Stability in a Poloxamer-Based Formulation:

In a series of experiments, the polymorph stability has been analyzed. Micronized (≤20 µm) polymorphs A and B were added to phosphate buffer containing a non-ionic tenside as vehicle formulation. After 30 hours, aliquots were drawn, washed, dried and prepared for the polymorph identity measurement by x-ray powder diffractometry (XRPD). The XRPD analysis demonstrated that in sample initially made from polymorph A, a polymorph conversion of 60% to polymorph B occurred during these 30 hours (FIG. 10). 48 hours after preparation XRPD analysis resulted in a 100% conversion of polymorphic form A to B. This data demonstrates that the inventive polymorph B is the stable crystal state in the formulation. Consistency analysis performed on a sample initially made from the inventive polymorph B in regular intervals over several months demonstrated no polymorph conversion (FIG. 12).

In one embodiment, the crystalline polymorphic form of 6-fluoro-9-methyl-9H-β-carboline has a particle size of the crystalline of ≤200 µm, preferred ≤175 µm, more preferred ≤150 µm, still more preferred ≤125 µm, still more preferred ≤100 µm, still more preferred ≤75 µm, and still more preferred ≤50 µm. Most preferred, said crystalline polymorphic form has a particle size of the crystal of ≤20 µm.

In Vivo Efficacy

The present application demonstrates that the polymorphic form B of 6-fluoro-9-methyl-β-carboline (6-FMC) impacts efficacy in vivo as outlined in Example 9. The results are shown in FIGS. 13 and 14.

The effect of an intratympanic administration of polymorph A of 6-FMC (0.12 mg) prepared freshly (less than 24 h before use) on the Permanent Threshold Shift has been investigated in guinea pigs (FIG. 13). The Permanent Threshold Shift (PTS) is defined as the difference between the post-traumatic hearing threshold measured on day 14 and the baseline hearing threshold measured on day −3.

Furthermore, the effect of an intratympanic administration of polymorph B of 6-FMC (0.12 mg) prepared at least 48 h before use, on the PTS in guinea pigs is presented in FIG. 14.

Using a noise induced hearing loss model (NIHL) in guinea pigs, the applicant investigated the efficacy of a single intratympanic 6-FMC application in the treatment of hearing loss. It was observed that animals treated with polymorph A of 6-FMC have a moderate improvement on the recovery of the PTS. When compared to vehicle treated animals, polymorph A treatment demonstrated 10-18 dBs recovery of the PTS at 16 kHz (FIG. 13). However, for clinical use a stronger effect would be needed.

Surprisingly, during further development a clear improvement in efficacy of the 6-FMC treated animals was observed, compared to previous experiments (FIG. 14).

Unexpectedly, a much stronger improvement of the PTS occurred across all investigated frequencies. The level of improvement increased from about 10-18 dBs as seen in FIG. 13 to 23-39 dBs as seen in FIG. 14. This improvement of 30 dB and more as seen with polymorphic form B is clinically most meaningful as hearing is expressed in a logarithmic manner (decibel). In humans a hearing loss of 18 dB can hardly be noticed by the individual while a hearing loss of 30 dB makes communication difficult in particular if a background noise occurs simultaneously. Surprisingly some frequencies (for example 4 and 8 kHz, FIG. 14) of animals treated with polymorphic form B of 6-FMC demonstrated a PTS close to zero.

This strong recovery is very important, because it elucidates the possibility that a treatment with polymorph B of 6-FMC can lead to a complete recovery of hearing following a noise induced hearing loss.

In order to investigate what was the underlying cause for the improved efficacy data, the applicant performed a thorough analysis of the experimental procedures and demonstrated that improvement in the efficacy depended on the preparation of drug formulation. Initially, always freshly prepared formulation was used immediately after preparation containing polymorph A. However, in the experiments which demonstrated increased efficacy, the formulation was prepared in advance and stored for at least 48 h before use. Subsequent analysis of the formulation demonstrated that formulation which initially was prepared with polymorphic form A, was fully converted into polymorphic form B, partially to 60% within 30 h (FIG. 10) and fully already after 48 h as shown in FIG. 11. Taken together these data show that identity of the polymorphic form of 6-FMC present in the formulation plays a very significant role. Additionally, the applicant demonstrated that formulation with polymorphic form B leads to a significant improvement of the in vivo efficacy data in the NIHL model in guinea pigs, when compared to formulation with polymorphic form A.

Method for Preparation of Crystalline Polymorphic Form

A further aspect of the present invention relates to a method for preparation of the inventive crystalline polymorphic form of 6-fluoro-9H-methyl-β-carboline, comprising the following steps:

A1) Providing 6-fluoro-9-methyl-9H-β-carboline of the formula (I)

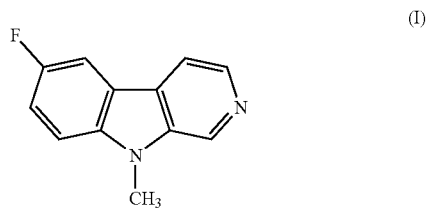

B1) dissolving 6-fluoro-9-methyl-9H-β-carboline in a mixture of a polar solvent and a non-polar solvent; or dissolving 6-fluoro-9-methyl-9H-β-carboline firstly in a polar solvent and adding a non-polar solvent to the resulting solution of 6-fluoro-9-methyl-9H-β-carboline in the polar solvent, wherein the polar solvent is dichloromethane, acetone, isopropanol, or a mixture thereof, or a mixture with water and the non-polar solvent is methyl tert-butylether, n-heptane, cyclohexane, or a mixture thereof and the ratio of the polar solvent and the non-polar solvent is in a range of 1:2 to 1:10;

C1) heating the solution or the suspension of 6-fluoro-9-methyl-9H-β-carboline to a temperature in the range between 40° C. to 100° C.;

D1) stirring the resulting solution for at least 10 min at the same temperature;

E1) cooling the resulting solution down to a temperature in the range between −10° C. to +30° C. to obtain the crystalline polymorphic form of 6-fluoro-9-methyl-9H-β-carboline according to claim 1; and F1) separating crystalline polymorphic form B of 6-fluoro-9-methyl-9H-β-carboline of the formula (I)

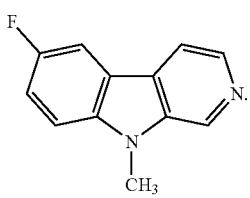

(I)

It has to be stressed that all initial attempts to prepare a crystalline form of 6-FMC resulted in the polymorphic form A. The polymorphic form A was obtained by crystallization from non-polar or slightly polar aprotic organic solvents like toluene cyclohexane or heptane. Therefore, the polymorphic form A was initially regarded as the stable polymorphic form by the Inventors, because always this polymorphic form A was obtained after recrystallization from n-heptane. Identifying the polymorphic form B as the much more stable and much more active form was a surprising result.

After realizing the polymorphic form B as pharmacologically highly potent and chemically highly stable, the above synthesis procedure was developed which selectively results in polymorphic form B.

The separated crystalline polymorphic form B of 6-fluoro-9-methyl-9H-β-carboline has the X-ray powder diffraction pattern comprising 2-theta angle values of 11.3, 17.1, 17.6, 18.0, 22.5, 23.2, and 29.4 degrees with a deviation ±0.2 degree as disclosed above.

Preferably, the crystalline polymorphic form B of 6-fluoro-9-methyl-9H-β-carboline has the X-ray powder diffraction pattern comprising 2-theta angle values of 11.3, 14.1, 17.1, 17.6, 18.0, 19.0, 20.3, 20.6, 22.5, 23.2, 24.3, 25.8, and 29.4 degrees with a deviation ±0.2 degree as disclosed above.

Also preferably, the inventive crystalline polymorphic form of 6-fluoro-9-methyl-9H-β-carboline (polymorph B) is in a monoclinic form having a space group of p2₁c, wherein one molecule of 6-fluoro-9-methyl-9H-β-carboline is in an asymmetric unit cell having unit cell dimension of a=3.85±0.1 Å, b=17.32±0.1 Å, c=13.77±0.1 Å, α=90±3°, β=91±3° and γ=90±3° as disclosed above.

More preferred, solid state $^{13}$C-NMR spectrum of said crystalline polymorphic form (polymorph B) of 6-fluoro-9-methyl-9H-β-carboline comprises peak at 28.6, 107.3, 110.2, 111.6, 112.8, 116.6, 121.5, 126.2, 138.0, 155.5, 156.1, 156.7, 157.1, 157.2, 157.7, 158.1, and 158.4 ppm with a deviation ±1 ppm as shown in FIG. 8B.

More preferred, the crystalline polymorphic form B of 6-fluoro-9-methyl-9H-β-carboline has a melting point of 123±1° C. as disclosed above.

Still more preferred, IR-spectrum of said crystalline polymorphic form B of 6-fluoro-9-methyl-9H-β-carboline comprises peaks at 803.27, 819.54, 852.30, 864.13, 893.22, 1024.99, 1126.71, 1148.77, 1183.98, 1272.31, 1283.82, 1333.10, 1362.06, 1426.98, 1448.53, 1481.82, 1554.80, and 1578.94 cm$^{-1}$ with a deviation ±5 cm$^{-1}$. Most preferred, the IR-spectrum of said crystalline polymorphic form B comprises peaks at 426.62, 524.31, 558.12, 604.22, 636.09, 704.73, 729.05, 742.59, 803.27, 819.54, 852.30, 864.13, 893.22, 1024.99, 1126.71, 1148.77, 1183.98, 1272.31, 1283.82, 1333.10, 1362.06, 1426.98, 1448.53, 1481.82, 1554.80, and 1578.94 cm$^{-1}$ with a deviation ±5 cm$^{-1}$ as disclosed above.

Preferably, in step B1) the concentration of 6-fluoro-9-methyl-9H-β-carboline in the mixture of organic solvents is in the range of 50 mM to 200 mM, preferably 50 mM to 150 mM, more preferably 80 mM to 120 mM.

After performing step C1), the suspension of 6-fluoro-9-methyl-9H-β-carboline is also converted into the resulting solution as mentioned in step D1).

Preferably, in step C1) the solution or the suspension of 6-fluoro-9-methyl-9H-β-carboline is heated at a temperature in the range between 40° C. to 60° C.

Preferably, during step D1) or after step D1) of the above-mentioned methods, the following step D2) is performed:

D2) concentrating the mixture of the resulting solution or suspension by evaporating the solvents, preferably under vacuum.

Optionally, in step E1) after cooling down the resulting solution, the following step can be performed:

E2) seeding the crystalline polymorphic form B of 6-fluoro-9-methyl-9H-β-carboline.

The various preparation methods are described in Examples 1 and 2 in details.

In some embodiments, in step A) of the above-described methods, 6-fluoro-9-methyl-9H-β-carboline of the formula (I) is in a crystalline polymorphic form A, wherein, said polymorphic form has the X-ray powder diffraction pattern comprising 2-theta angle values of 11.9, 16.5, 26.7, and 28.1 degrees with a deviation ±0.2 degree or alternatively 11.9, 13.8, 16.5, 20.0, 23.8, 24.0, 25.6, 26.2, 26.7, and 28.1 degrees with a deviation ±0.2 degree.

Pharmaceutical Composition and Medical Use

A further aspect of the present invention relates to a medical use of the crystalline polymorphic form of 6-fluoro-9-methyl-β-carboline (polymorphic form B) according to the invention, wherein the inventive crystalline polymorphic form of 6-fluoro-9-methyl-9H-β-carboline has the X-ray powder diffraction pattern comprising 2-theta angle values of 11.3, 17.1, 17.6, 18.0, 22.5, 23.2, and 29.4 degrees with a deviation ±0.2 degree.

Preferred, said crystalline polymorphic form B of 6-fluoro-9-methyl-9H-β-carboline has the X-ray powder diffraction pattern comprising 2-theta angle values of 11.3, 14.1, 17.1, 17.6, 18.0, 19.0, 20.3, 20.6, 22.5, 23.2, 24.3, 25.8, 28.4 and 29.4 degrees with a deviation ±0.2 degree as disclosed above.

Also preferred, said crystalline polymorphic form is in a monoclinic form having a space group of p2₁c, wherein one molecule of 6-fluoro-9-methyl-9H-β-carboline is in an asymmetric unit cell having unit cell dimension of a=3.85±0.1 Å, b=17.32±0.1 Å, c=13.77±0.1 Å, α=90±3°, β=91±3° and γ=90±3° as disclosed above.

More preferred, solid state $^{13}$C-NMR spectrum of said crystalline polymorphic form of 6-fluoro-9-methyl-9H-β-carboline comprises peak at 28.6, 107.3, 110.2, 111.6, 112.8, 116.6, 121.5, 126.2, 138.0, 155.5, 156.1, 156.7, 157.1, 157.2, 157.7, 158.1, and 158.4 ppm with a deviation ±1 ppm as shown in FIG. 8B as mentioned above.

Still more preferred, said crystalline polymorphic form B of the pharmaceutical formulation has a melting point of 123±1° C.

Still more preferred, the IR-spectrum of said crystalline polymorphic form B of the pharmaceutical formulation comprises peaks at 803.27, 819.54, 852.30, 864.13, 893.22, 1024.99, 1126.71, 1148.77, 1183.98, 1272.31, 1283.82, 1333.10, 1362.06, 1426.98, 1448.53, 1481.82, 1554.80, and 1578.94 cm$^{-1}$ with a deviation ±5 cm$^{-1}$.

In one embodiment, said above-mentioned crystalline polymorphic form of 6-fluoro-9-methyl-β-carboline (polymorphic form B) according to the invention is useful for the treatment and/or prophylaxis of hearing damage, vertigo or vestibular disorder.

Preferably, said above-mentioned crystalline polymorphic form B of 6-fluoro-9-methyl-β-carboline is useful for the treatment and/or prophylaxis of hearing damage, vertigo or vestibular disorder, wherein the hearing damage, vertigo or vestibular disorders is selected from the group consisting of Meniere's disease, sudden sensorineural hearing loss, noise induced hearing loss, age related hearing loss, autoimmune ear disease, tinnitus, acoustic trauma, explosion trauma, labyrinthine deafness, presbycusis, trauma during implantation of inner ear prosthesis (insertion trauma), vertigo due to diseases of the inner ear, and hearing damages due to antibiotics and cytostatics.

A further aspect of the present invention relates to the pharmaceutical composition comprising the above-mentioned crystalline polymorphic form of 6-fluoro-9-methyl-9H-β-carboline (polymorphic form B) together with at least one pharmaceutically acceptable carrier, excipient, solvent and/or diluent.

In one embodiment, said pharmaceutical composition is useful for the treatment and/or prophylaxis of hearing damage, vertigo or vestibular disorder.

Preferably, said pharmaceutical composition is useful for the treatment and/or prophylaxis of hearing damage, vertigo or vestibular disorder, wherein the hearing damage, vertigo or vestibular disorders is selected from the group consisting of Meniere's disease, sudden sensorineural hearing loss, noise induced hearing loss, age related hearing loss, autoimmune ear disease, tinnitus, acoustic trauma, explosion trauma, labyrinthine deafness, presbycusis, trauma during implantation of inner ear prosthesis (insertion trauma), vertigo due to diseases of the inner ear, and hearing damages due to antibiotics and cytostatics.

The above-mentioned polymorphic form B of 6-fluoro-9-methyl-β-carboline or the above-mentioned pharmaceutical compositions comprising the polymorphic form B of 6-fluoro-9-methyl-β-carboline may be prepared and administered in form of transdermal application systems (plaster, film), droplets, pills, dragées, gels, hydrogels, ointments, sirups, granulates, suppositories (uvulas), emulsions, dispersions, microformulations, nanoformulations, liposomes, solutions, juices, suspensions, infusion solutions or injection solutions. Preferred are pharmaceutical compositions in form of liposomes, ointments, suspensions, gels and emulsions. Especially preferred are hydrogel formulations.

Such compositions are among others suitable for intravenous, intraperitoneal, intramuscular, subcutaneous, mucocutaneous, rectal, transdermal, topical, buccal, intradermal, intragastral, intracutaneous, intranasal, intrabuccal, percutaneous, intratympanic or sublingual administration. Especially preferred is the administration or injection into the middle ear as well as the topical administration through the ear drum.

As pharmaceutically acceptable carrier may be used for example lactose, starch, sorbitol, sucrose, cellulose, magnesium stearate, dicalcium phosphate, calcium sulfate, talc, mannitol, ethyl alcohol and the like. Powders as well as tablets can consists of 5 to 95 wt % of such a carrier.

Liquid formulations comprise solutions, suspensions, sprays and emulsions. For example, injection solutions based on water or based on water-propylene glycol for parenteral injections. For preparation of suppositories preferably low-melting waxes, fatty acid esters and glycerides are used.

The pharmaceutical compositions further comprise gels and other viscous drug carriers that are biodegradable or non-biologically degradable, aqueous or non-aqueous or based on microspheres.

Preferred, the pharmaceutical composition according to the invention is formulated for a topical and/or local administration. Suitable carrier for an otogenic administration, i.e. for an administration into the (middle) ear, are organic and inorganic substances that are pharmaceutically acceptable and do not react with the crystalline compound according to the invention and/or its further active agents, for instance cooking salt, alcohols, vegetable oils, benzyl alcohols, alkyl glycols, polyethylene glycols, glycerine triacetate, gelatine, carbohydrates like lactose or starch, magnesium carbonate (magnesia, chalk), stearate (waxes), talc and petrolatum (vaseline). The described compositions can be sterilized and/or can contain adjuvants like lubricants, preservatives like thiomersal (i.e. 50 wt %), stabilizers and/or humectants, emulsifiers, salts for affecting the osmotic pressure, buffer substances, dyes and/or flavors. These compositions may also contain one or multiple additional active agents, if necessary. The otogenic and/or audiological compositions according to the invention may comprise different compounds and/or substances, for instance other bioactive substances like antibiotics, anti-inflammatory active agents like steroids, corticoids, analgesics, antipyrines, benzocaines, procaines.

Compositions according to the present invention for topical administration can contain other pharmaceutically acceptable compounds and/or substances. In a preferred embodiment of the present invention a topical excipient is selected, which does not amplify the release of the crystalline 6-fluoro-9-methyl-β-carboline, and of the possibly additional active agent or active agents to the blood circular system or to the central nervous system, when it is administered to the ear, in the middle ear or in the auditory canal. Possible carrier substances contain hydrocarbonic acids, water-free adsorbents like hydrophile petrolatum (vaseline) and water-free lanolin (i.e. Aquaphor®) and means based on water-oil emulsions like lanolin and Cold Cream. More preferred are carrier substances that essentially are non-excluding and that contain usually carrier substances, which are water soluble as well as substances based on oil-in-water emulsions (creams or hydrophilic ointments) and substances with a water-soluble basis like carrier substances based on polyethylene glycol and aqueous solutions that were gelled with several substances like methylcellulose, hydroxyethylcellulose and hydroxypropylmethylcellulose.

DESCRIPTION OF THE FIGURES

FIG. 1: A) crystals of polymorph A; B) crystals of polymorph B

The crystal structures of the polymorphs A and B were obtained by recrystallisation in heptane and a mixture of MTBE and acetone or DCM respectively.

Figure 3:
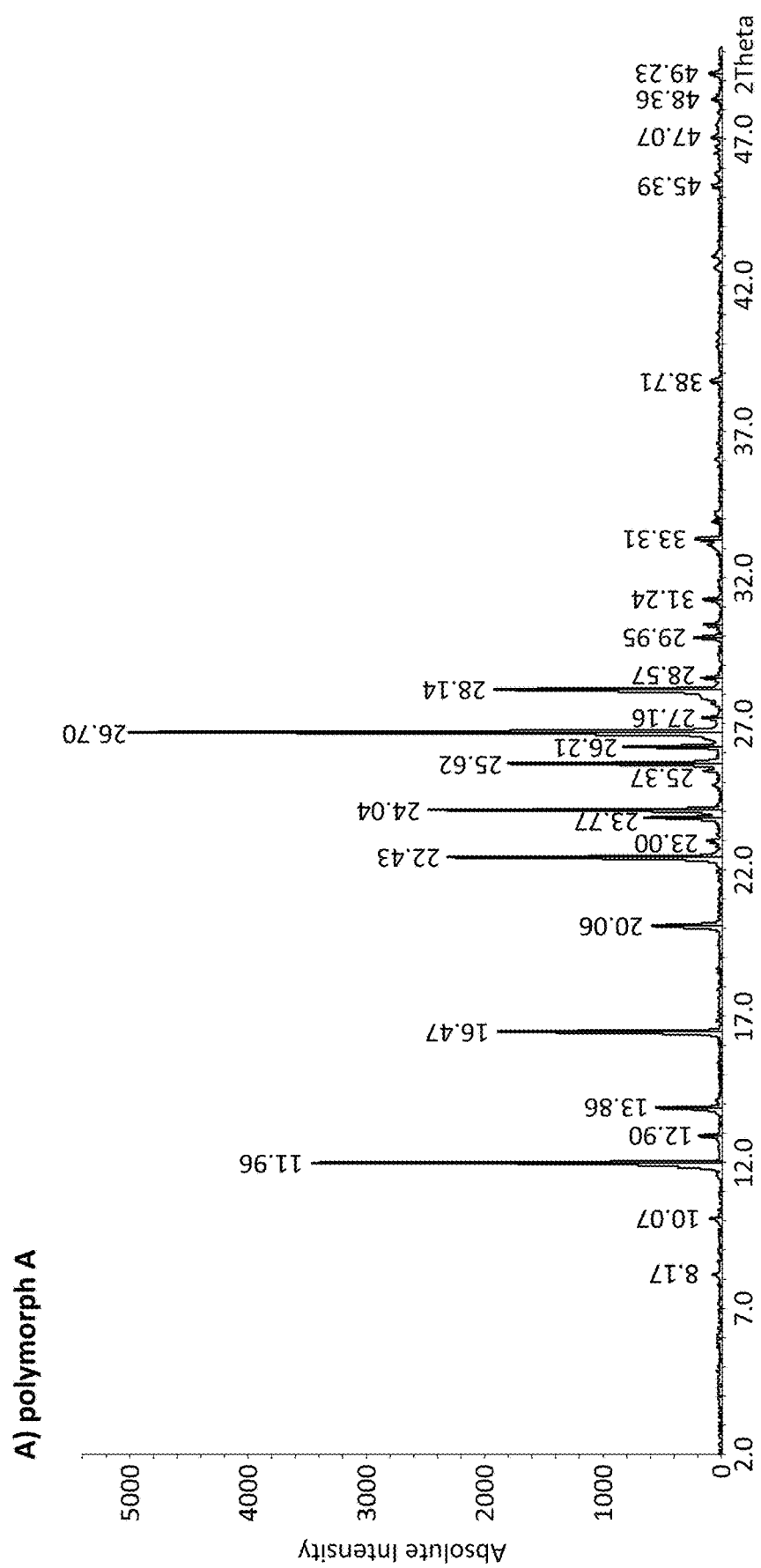
Figure 3:
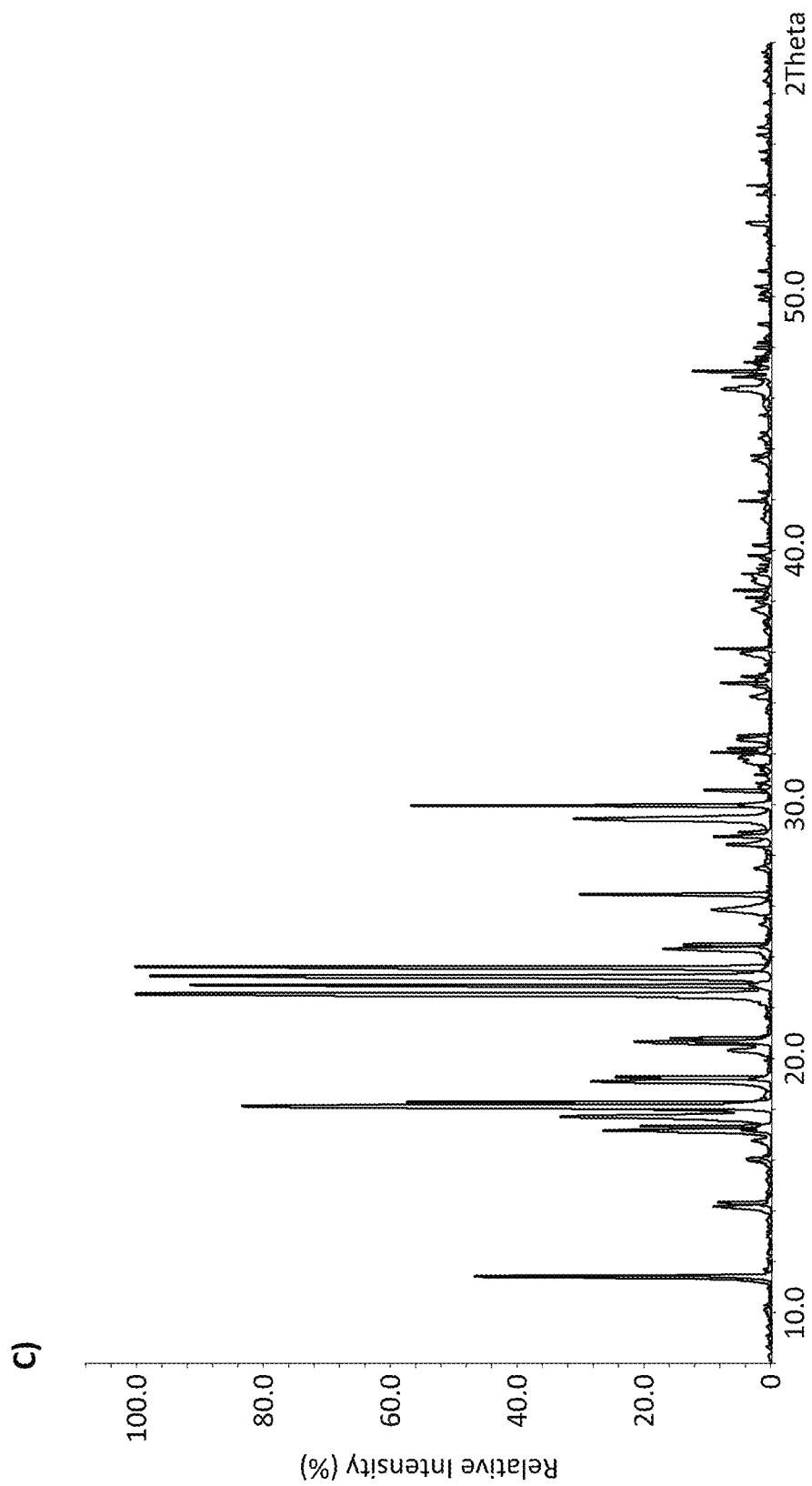
Figure 4:
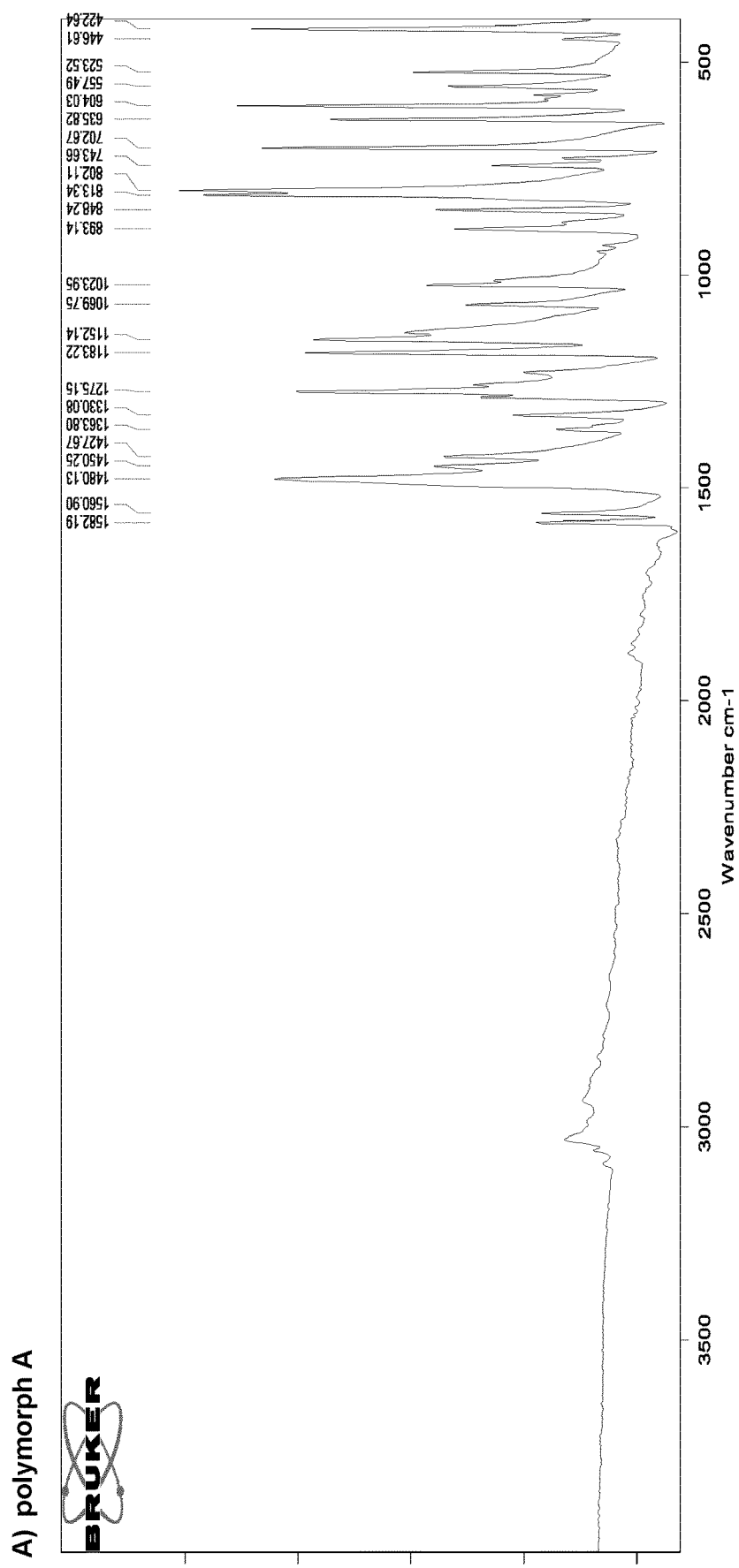
Figure 4:
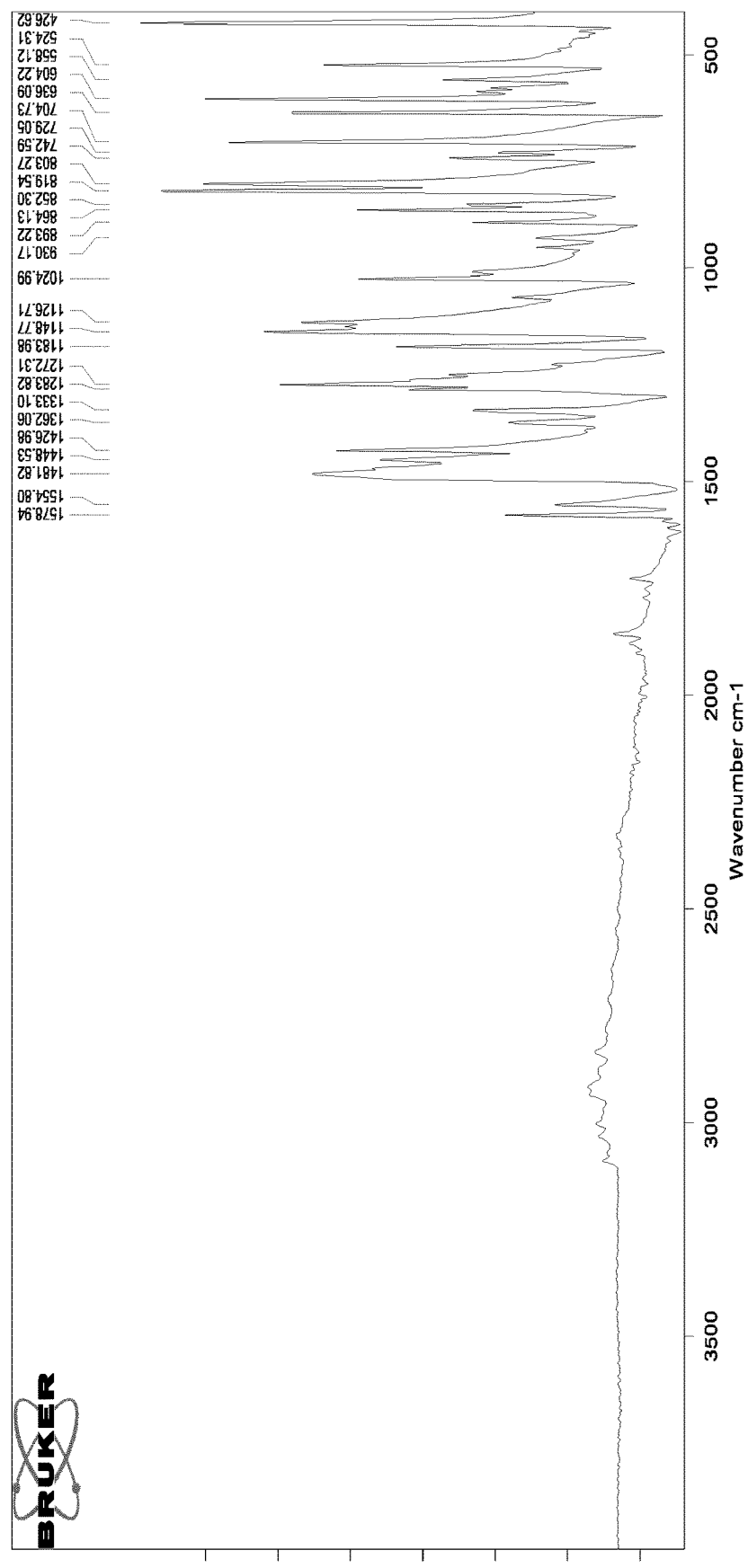
Figure 5:
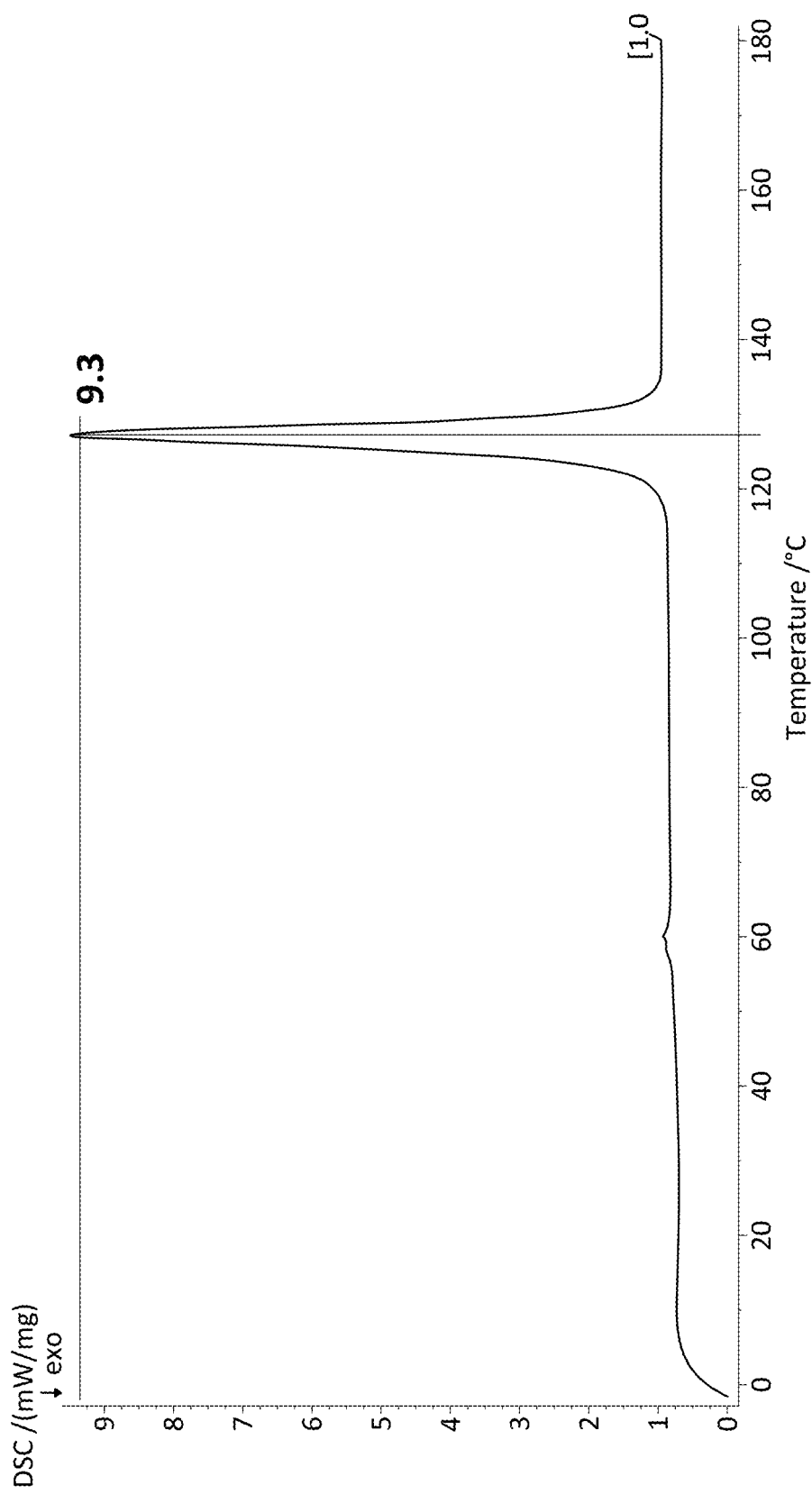
Figure 5:
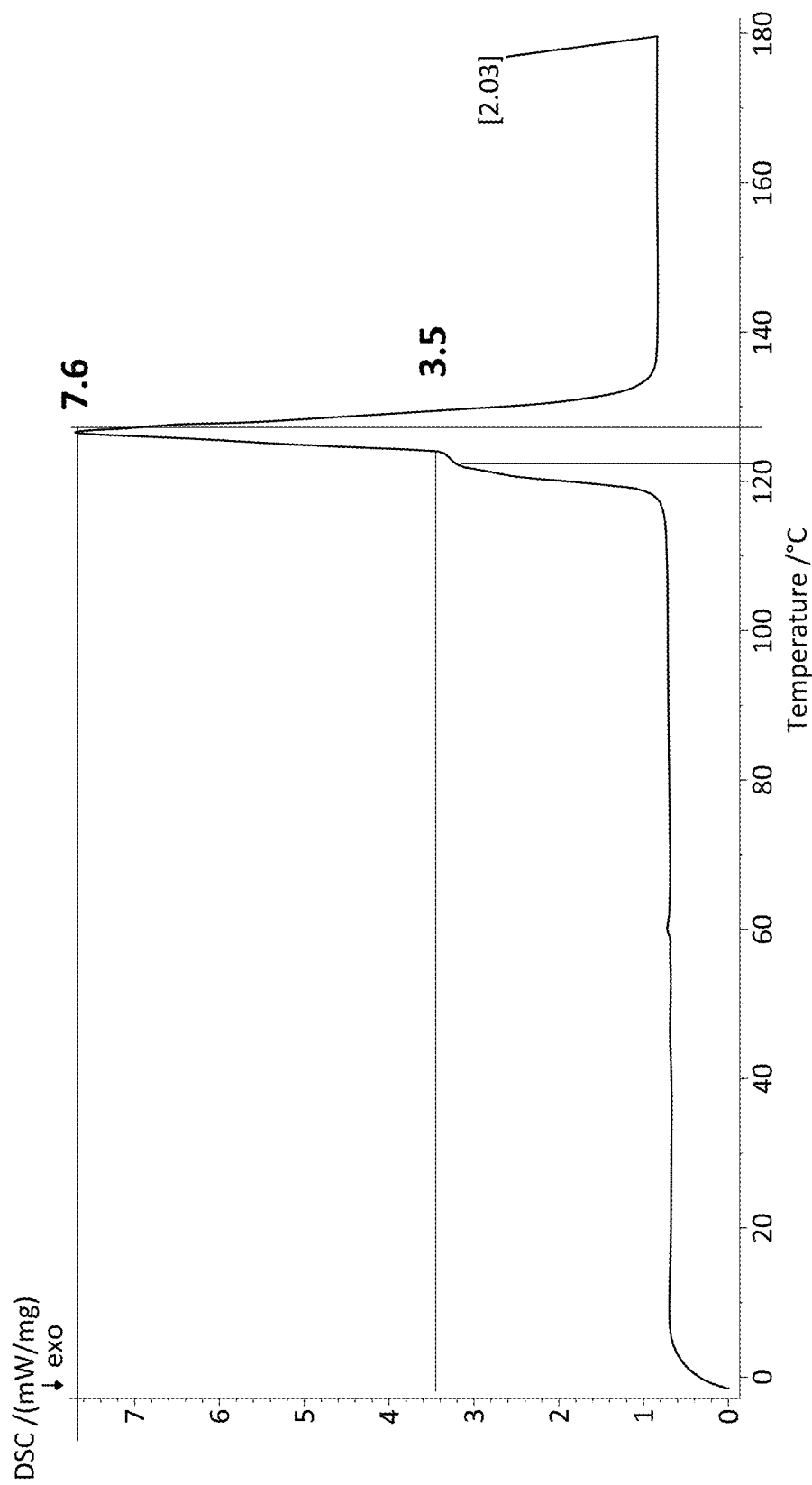
Figure 6:
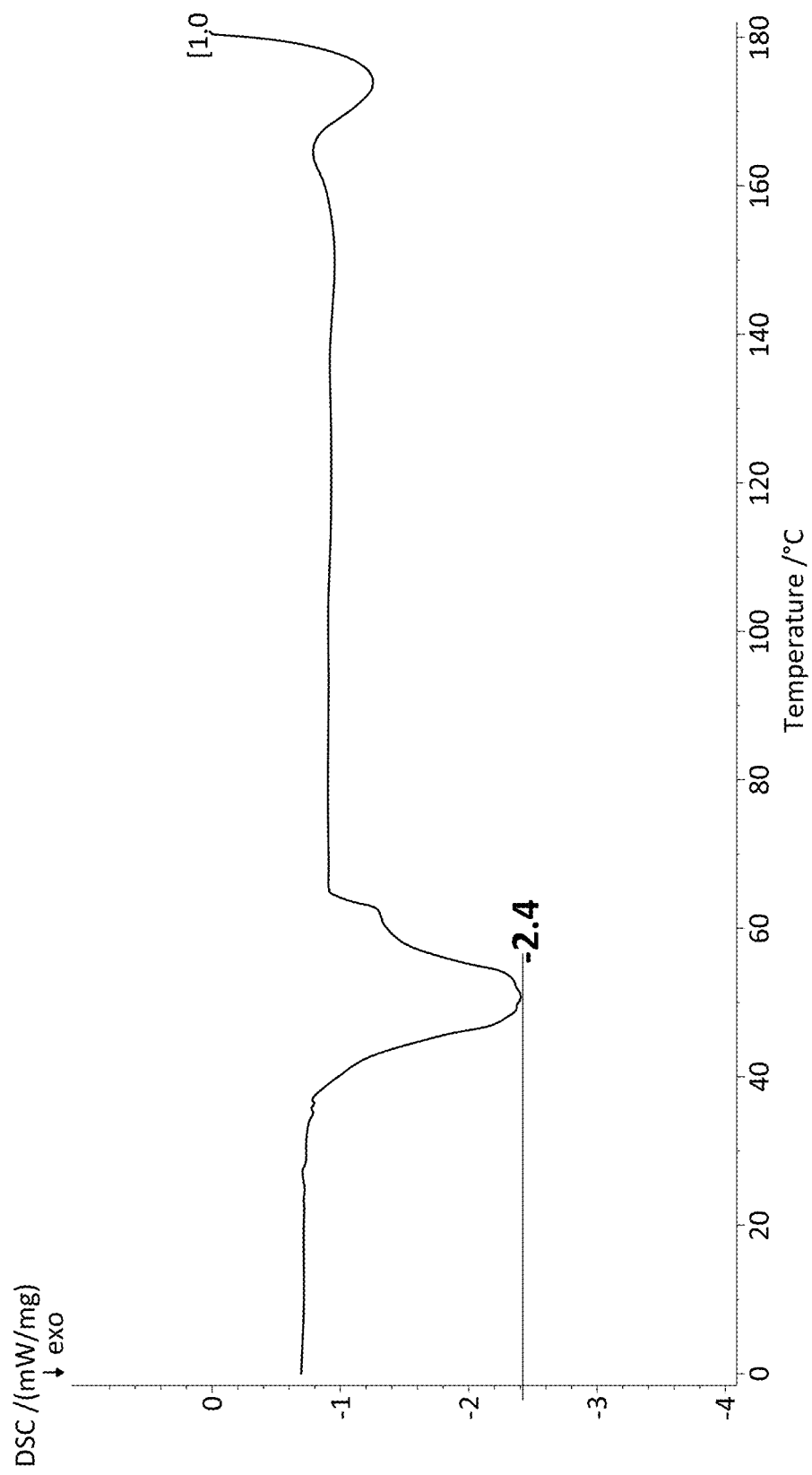
Figure 7:
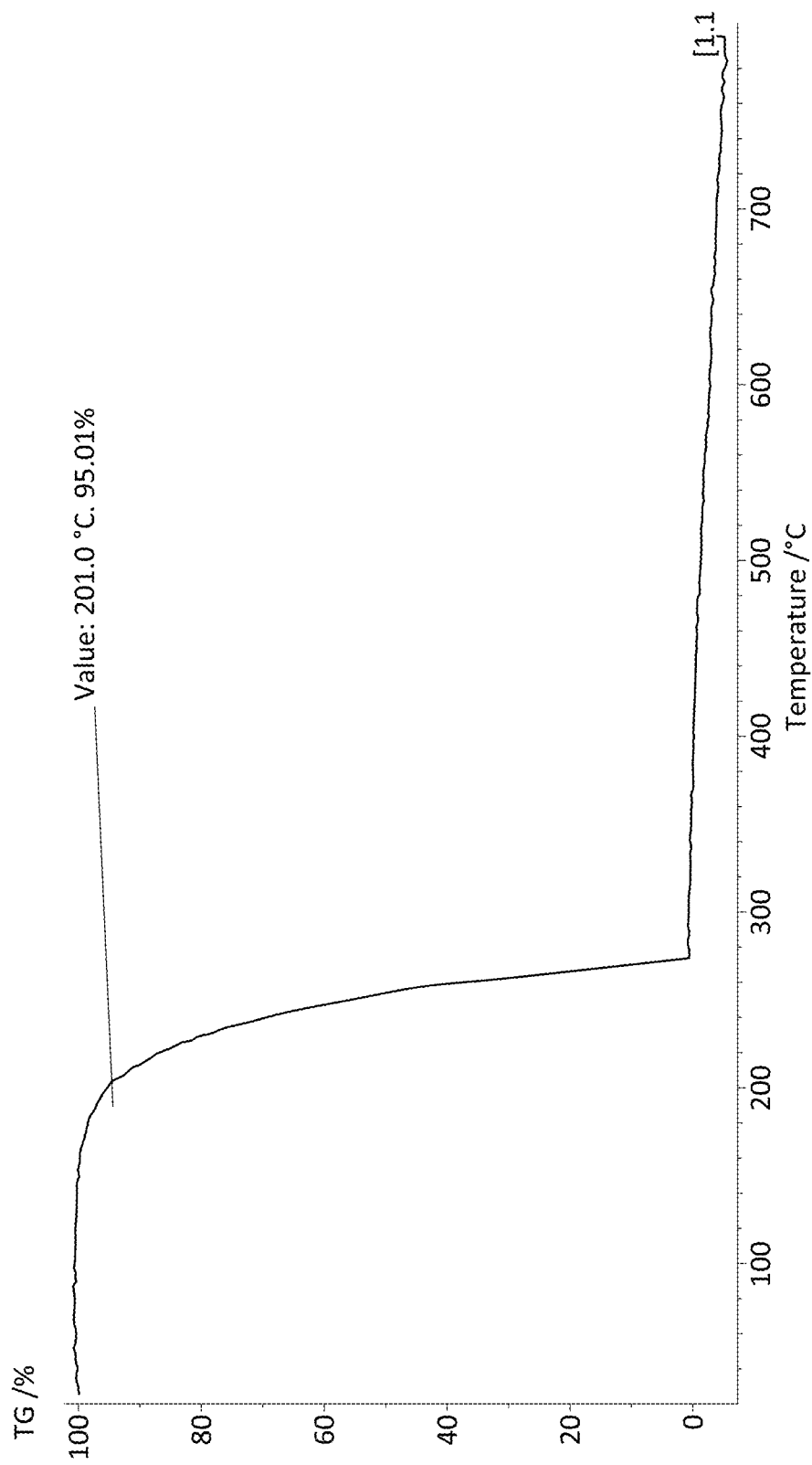
Figure 7:
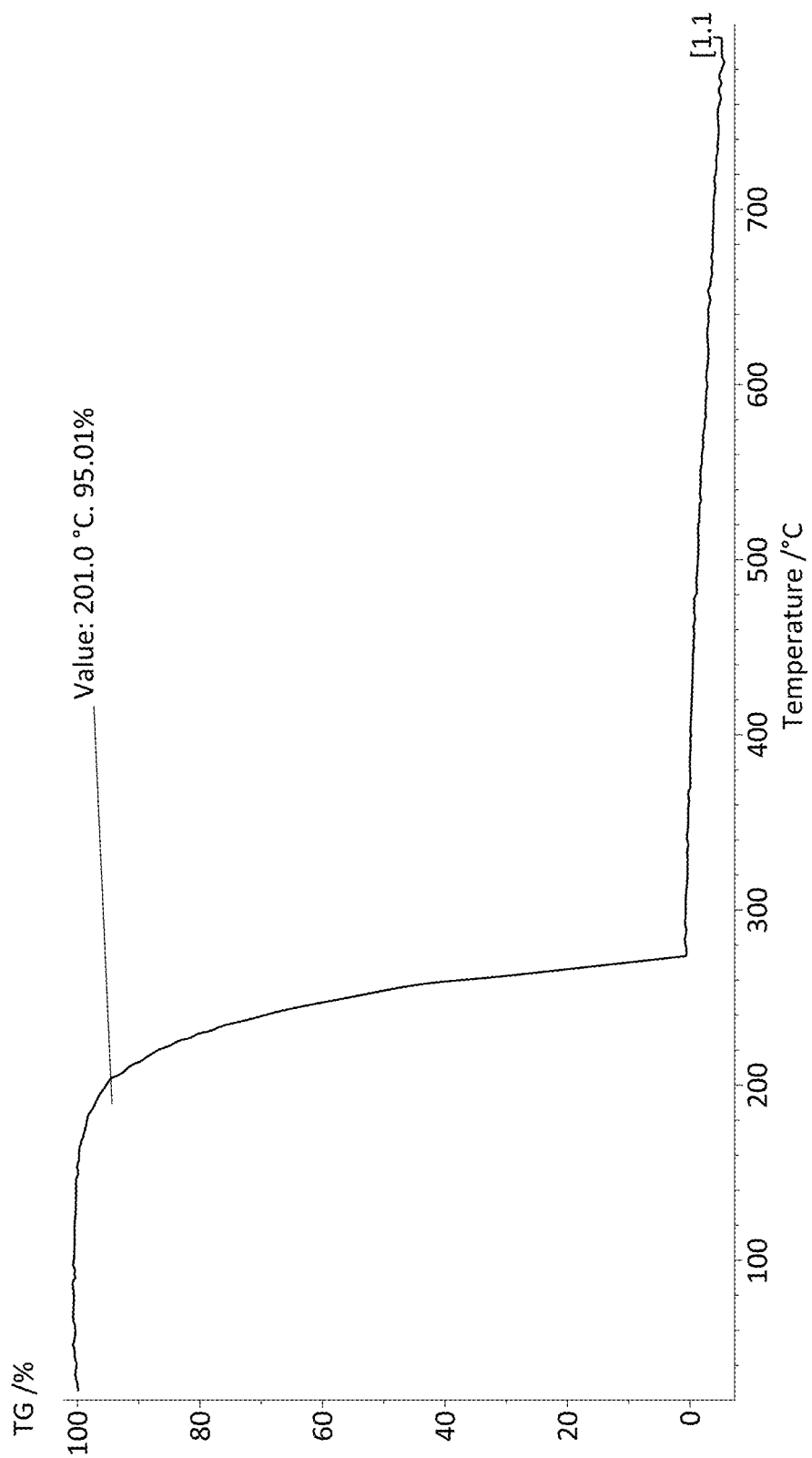
Figure 8:
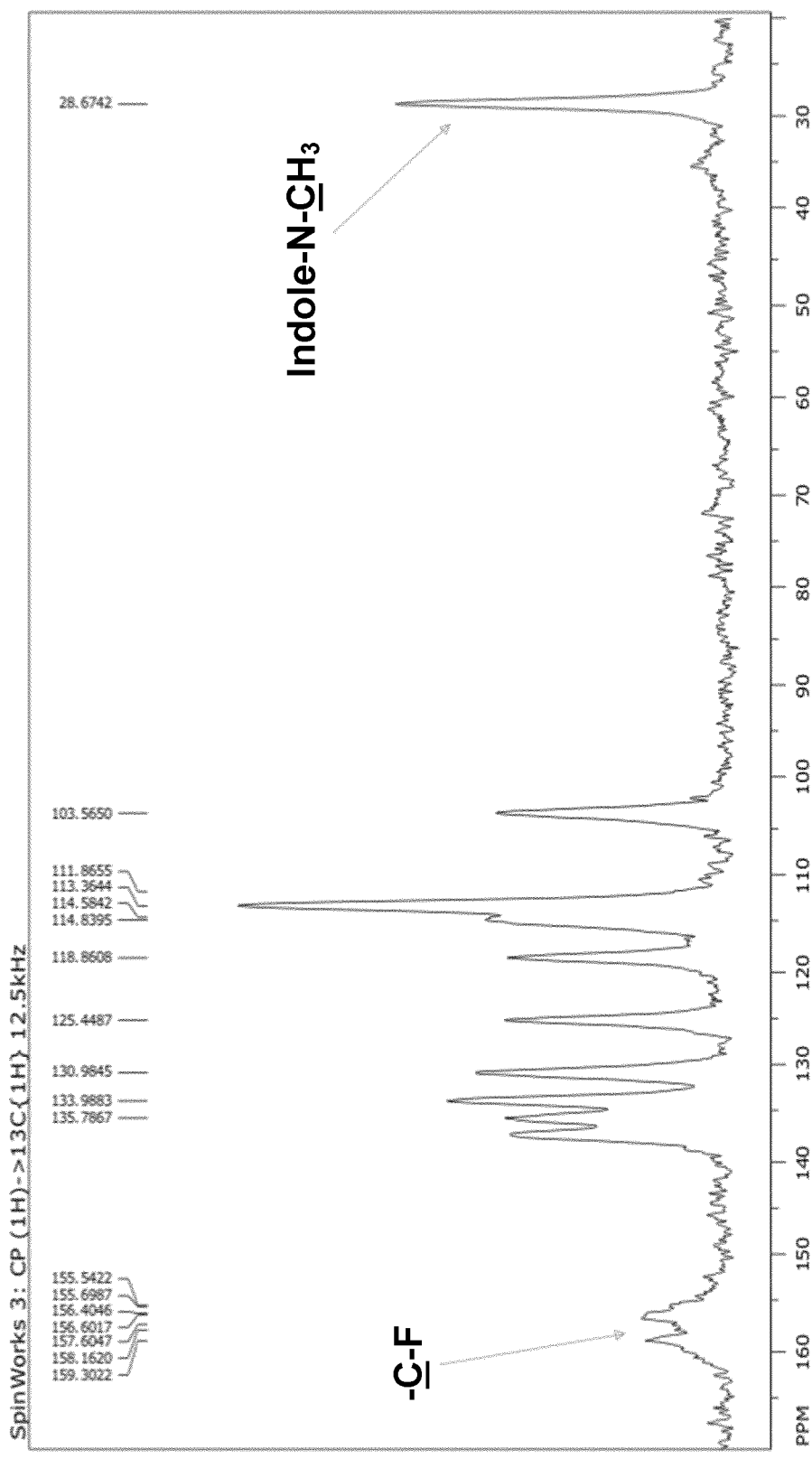
Figure 8:
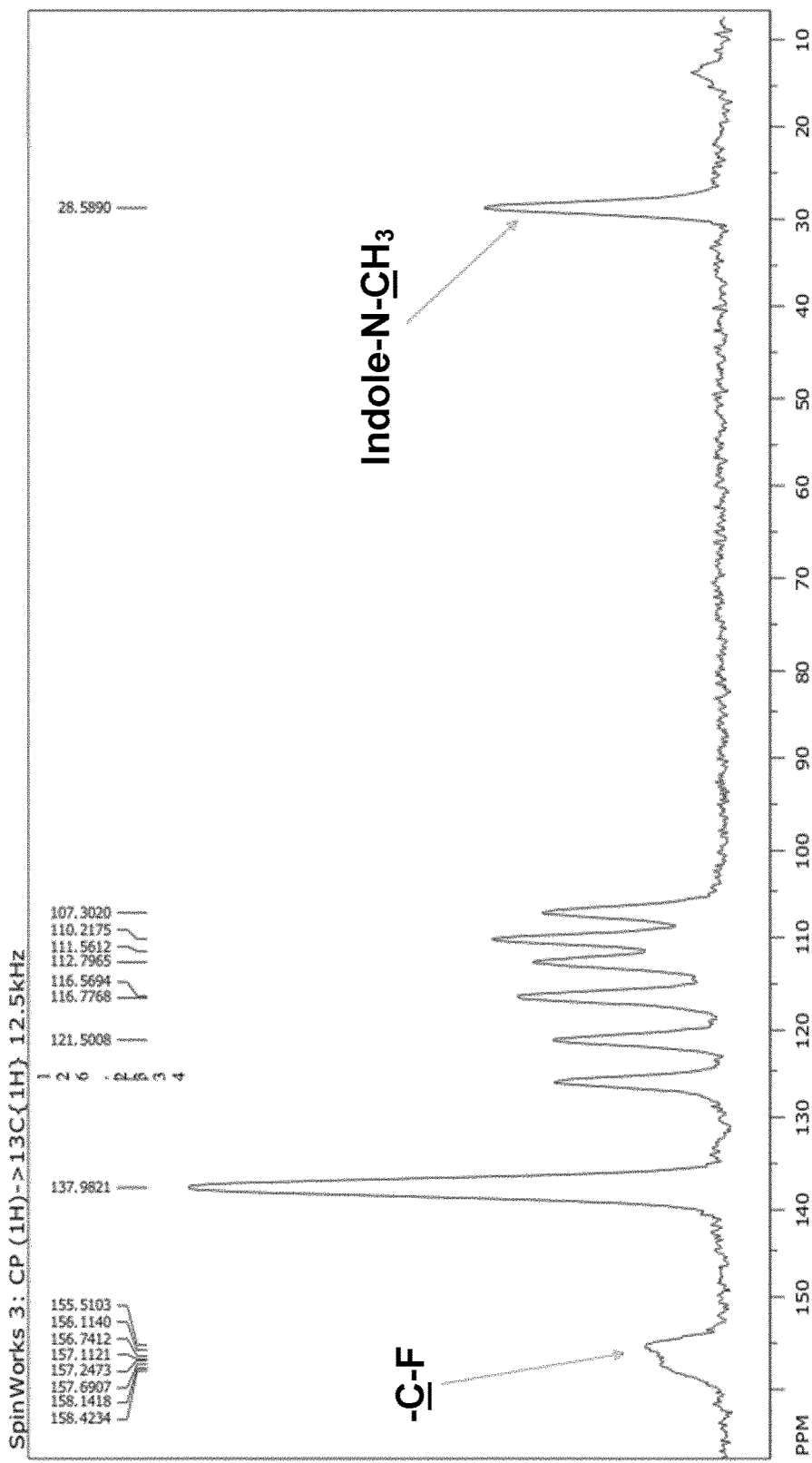
Figure 9:
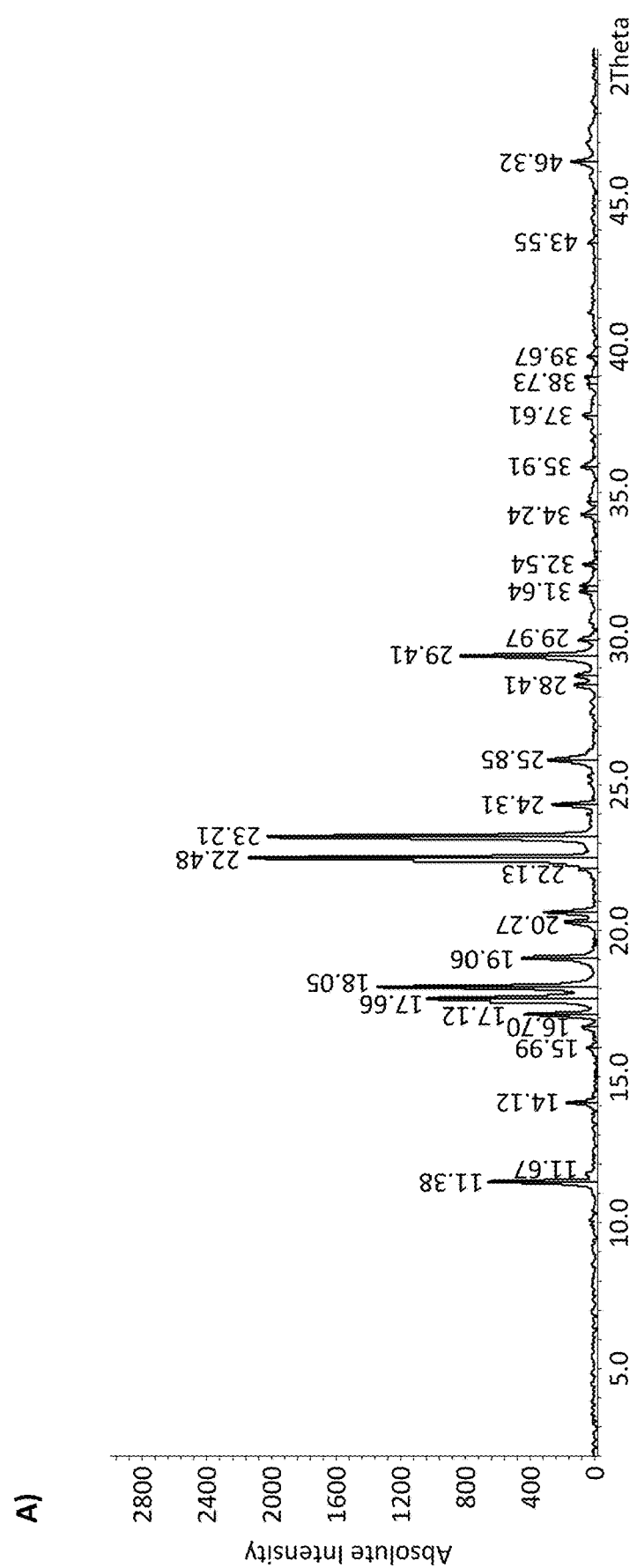
Figure 9:
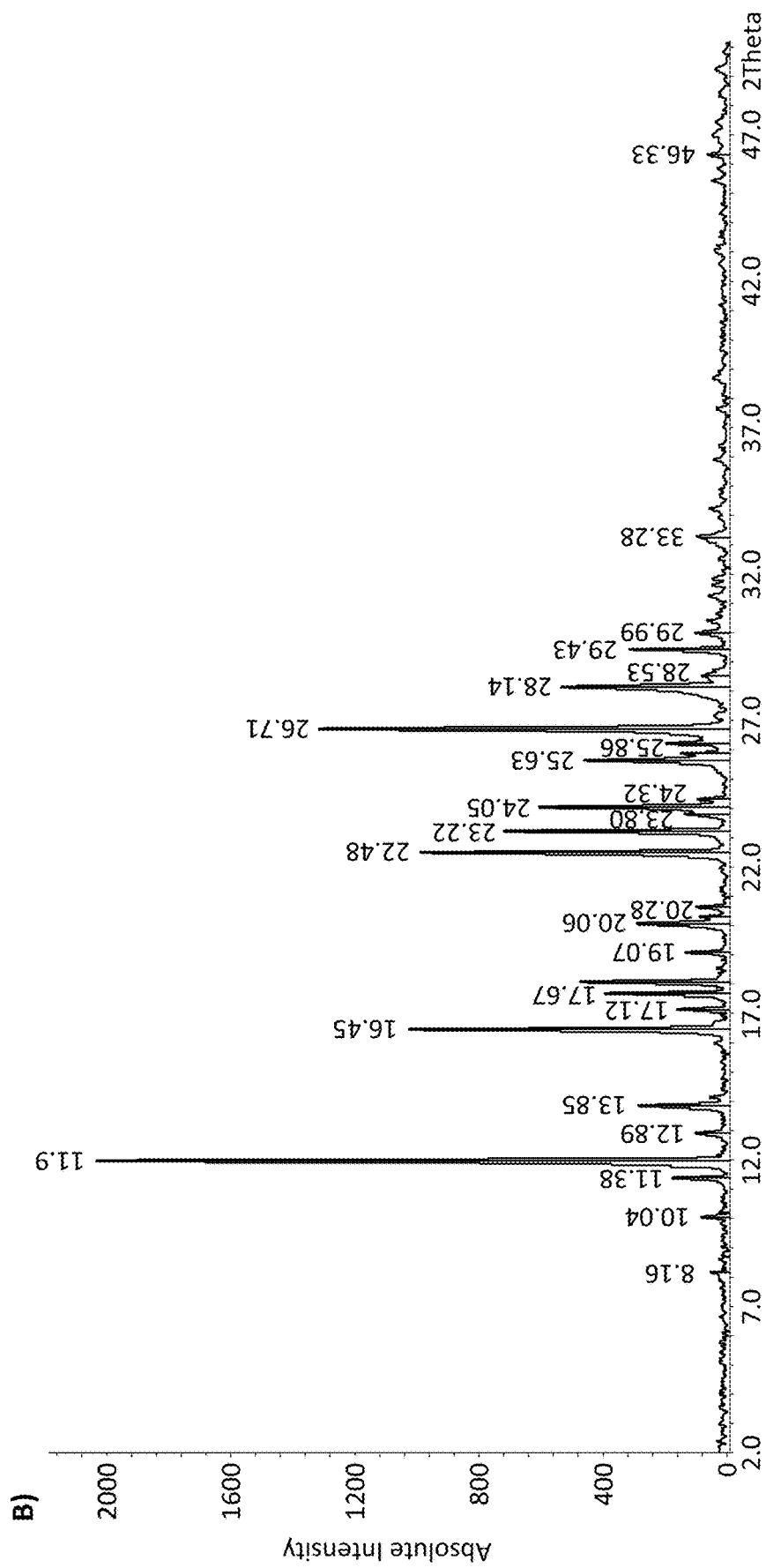
Figure 9:

FIG. 2:

A) Molecular network of 6-FMC polymorph A in a single crystal (left) and the respective chemical structure (right) as calculated by diffractometry B) Molecular network of 6-FMC polymorph B in a single crystal (left) and the respective chemical structure (right) as calculated by diffractometry FIG. 3:
A) X-ray powder diffraction (XRPD) of polymorph A
B) X-ray powder diffraction (XRPD) of polymorph B
C) An overlay of XRPD signatures, calculated by using Mercury® based on the x-ray structure of polymorph B and the measured structure of polymorph B FIG. 4:
A) Infrared (IR)-spectrum of polymorph A
B) Infrared (IR)-spectrum of polymorph B FIG. 5:
A) DSC Melting curve of polymorph A
B) DSC Melting curve of polymorph B FIG. 6:
A) DSC Cooling curve of polymorph A
B) DSC Cooling curve of polymorph B FIG. 7:
A) Thermal gravimetric analysis of polymorph A
B) Thermal gravimetric analysis of polymorph B FIG. 8: Solid-state nuclear magnetic resonance (ssNMR)
A) $^{13}$C ssNMR of polymorph A
B) $^{13}$C ssNMR of polymorph B FIG. 9: Supercritical carbon dioxide
A) Spectrum of the polymorph before inserting into the apparatus (polymorph B; ExtrateX supercritical fluid innovation).
B) Spectrum of the polymorph after treating polymorph B with supercritical carbon dioxide (yields polymorph A).
C) Precipitate after exposition of 6-FMC to supercritical carbon dioxide The cylinder of the apparatus in which the supercritical $CO_2$ had been introduced was loaded with polymorph B (FIG. 9.A) and heated to 60° C. and a pressure of 35 MPa. The time amounted to 2.5 hrs during which the API dissolved completely in the supercritical $CO_2$. The spectrum of the final product is shown in FIG. 9.B. It is quite obvious that a transformation happened of polymorph B into polymorph A. The powder was white (FIG. 9C).

Figure 10:
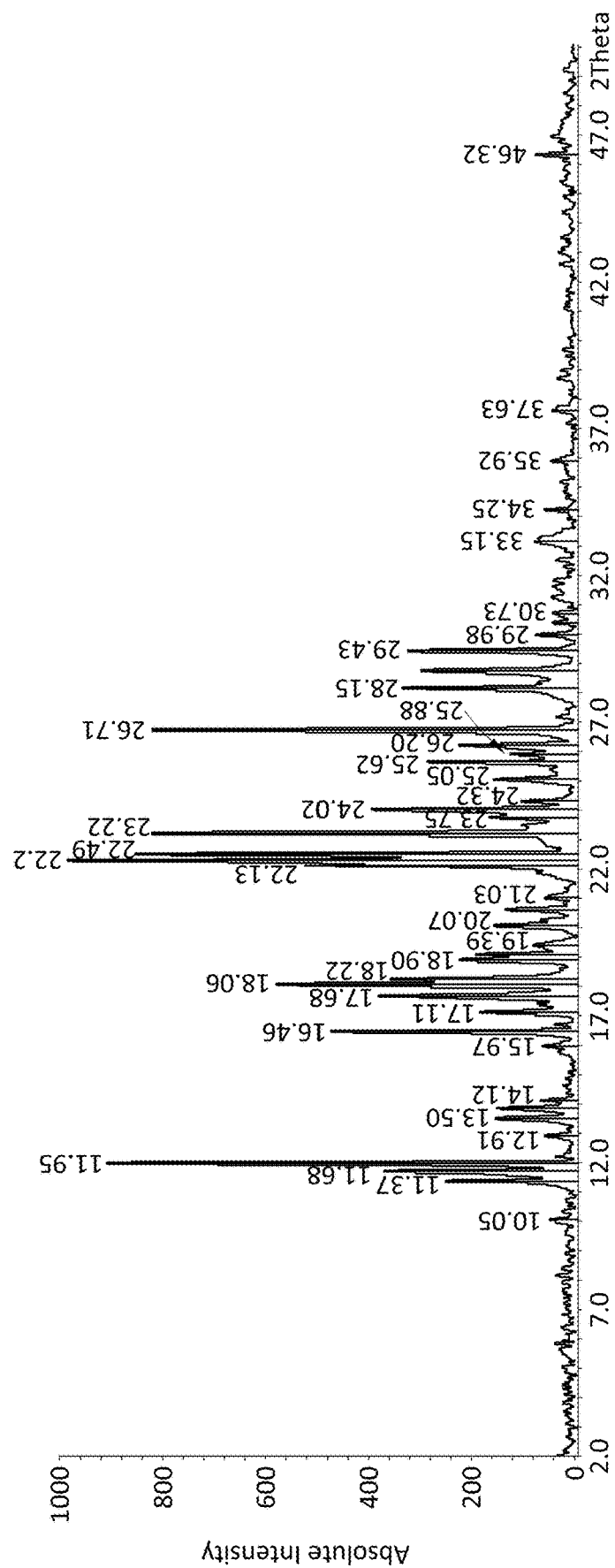

FIG. 10: X-ray powder diffraction (XRPD) of polymorphic form A in a poloxamer based formulation after 30 hrs shows that 60% conversion of initially introduced polymorphic form A into the inventive polymorphic form B.

Figure 11:
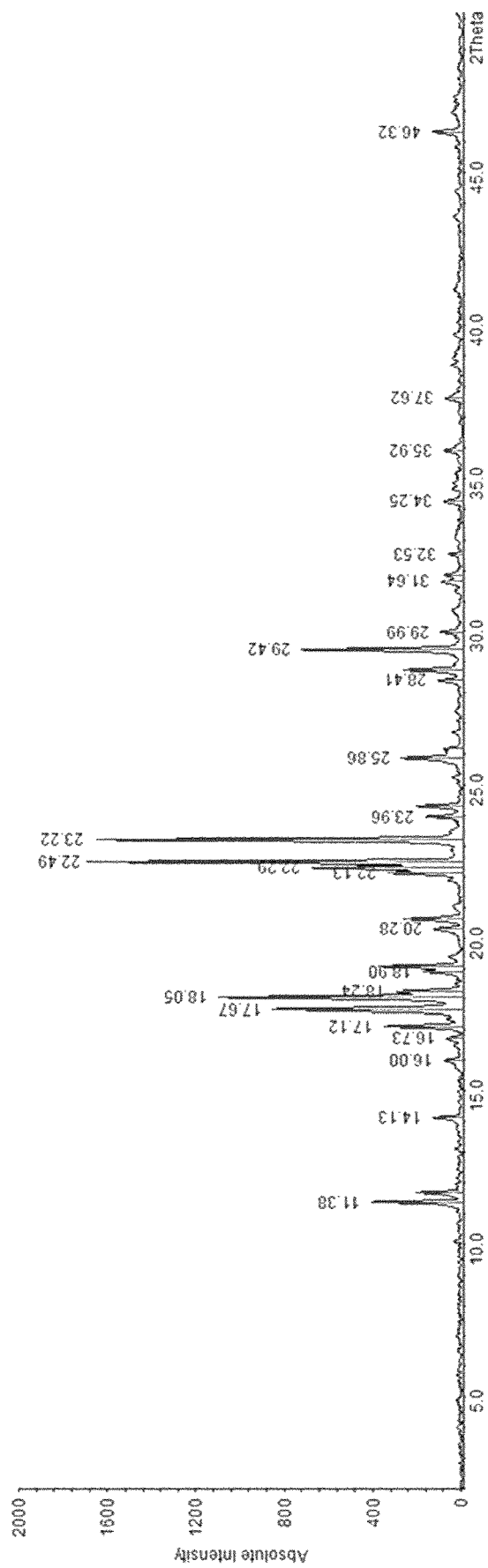

FIG. 11: After 48 h in formulation, from initially introduced inventive polymorphic A 100% conversion to polymorphic form B takes place.

Figure 12:
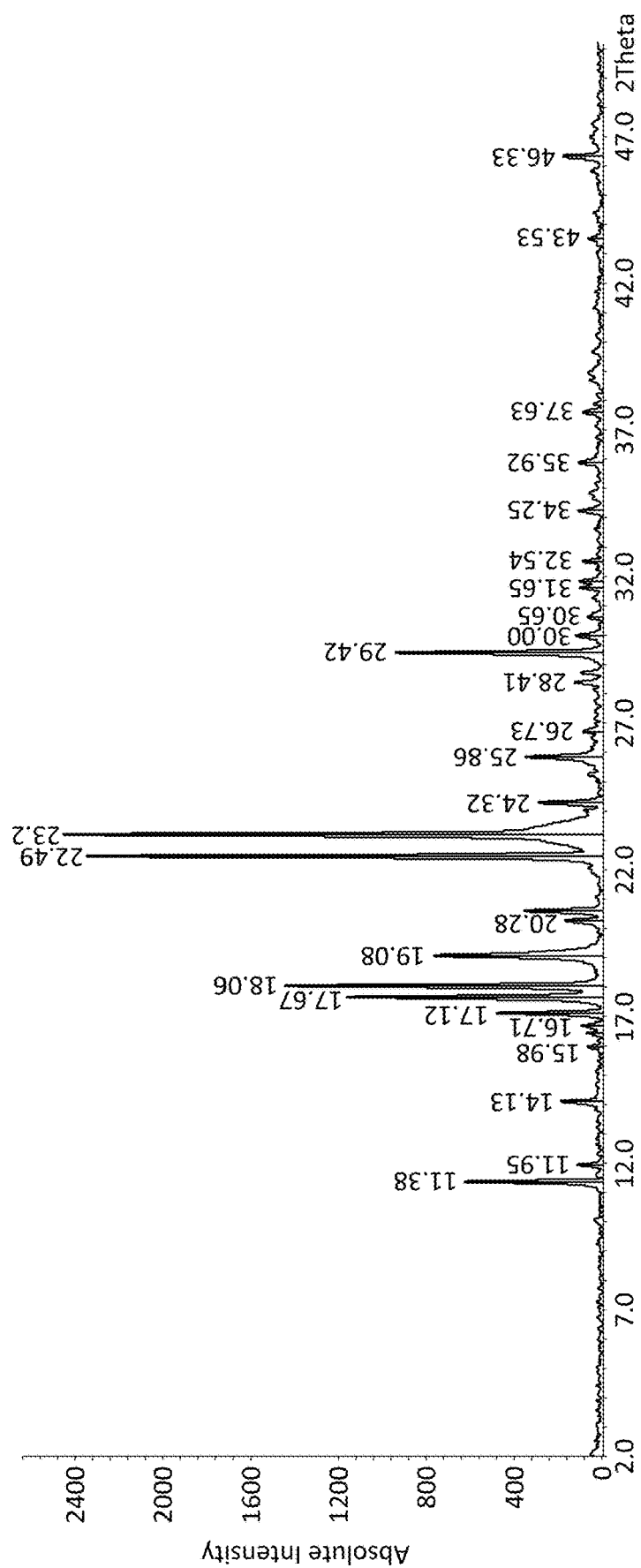

FIG. 12: After 30 h in formulation, from initially introduced inventive polymorph B no conversion takes place.

Figure 13:
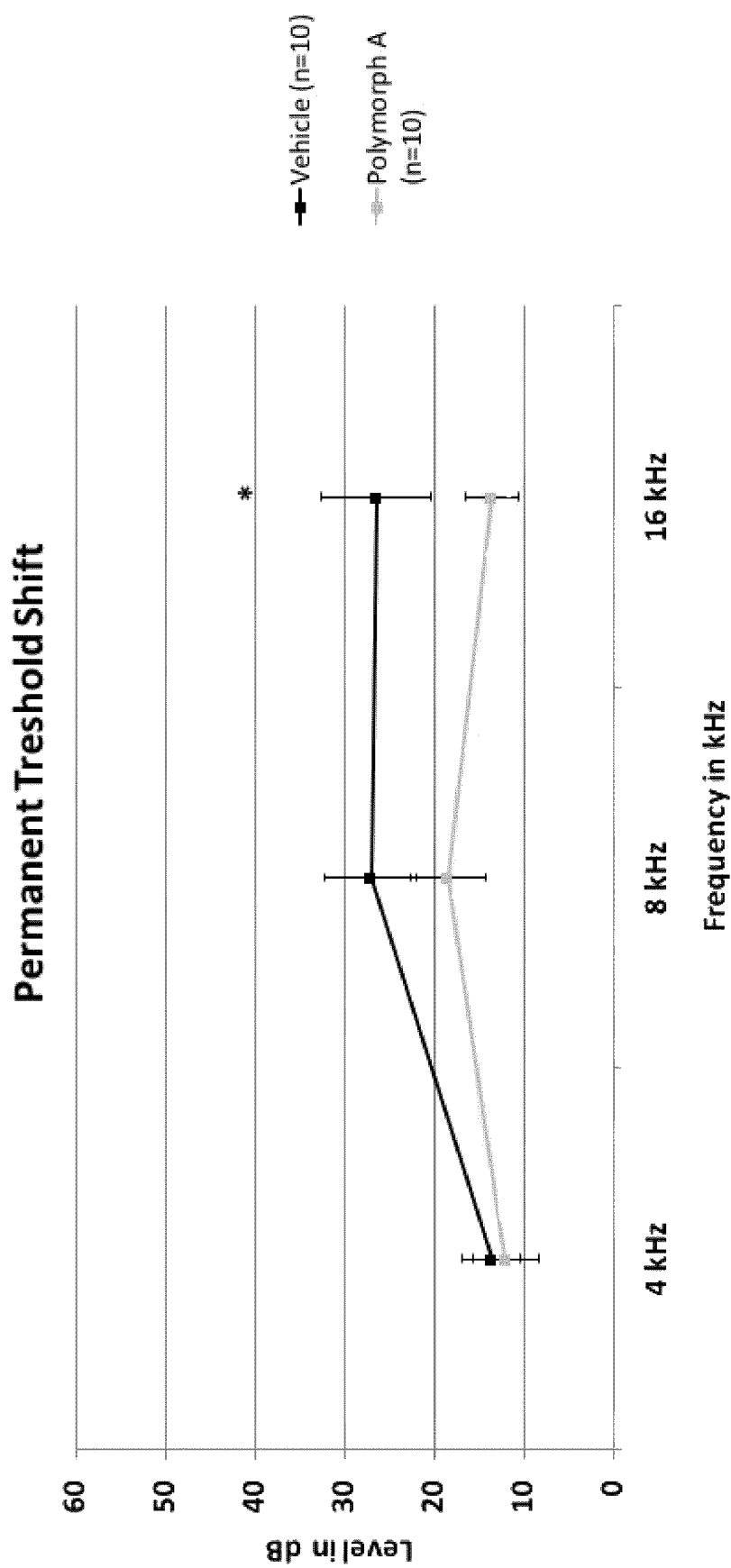

FIG. 13: The effect of an intratympanic administration of polymorph A of 6-FMC (0.12 mg) on the PTS in guinea pigs.

Figure 14:
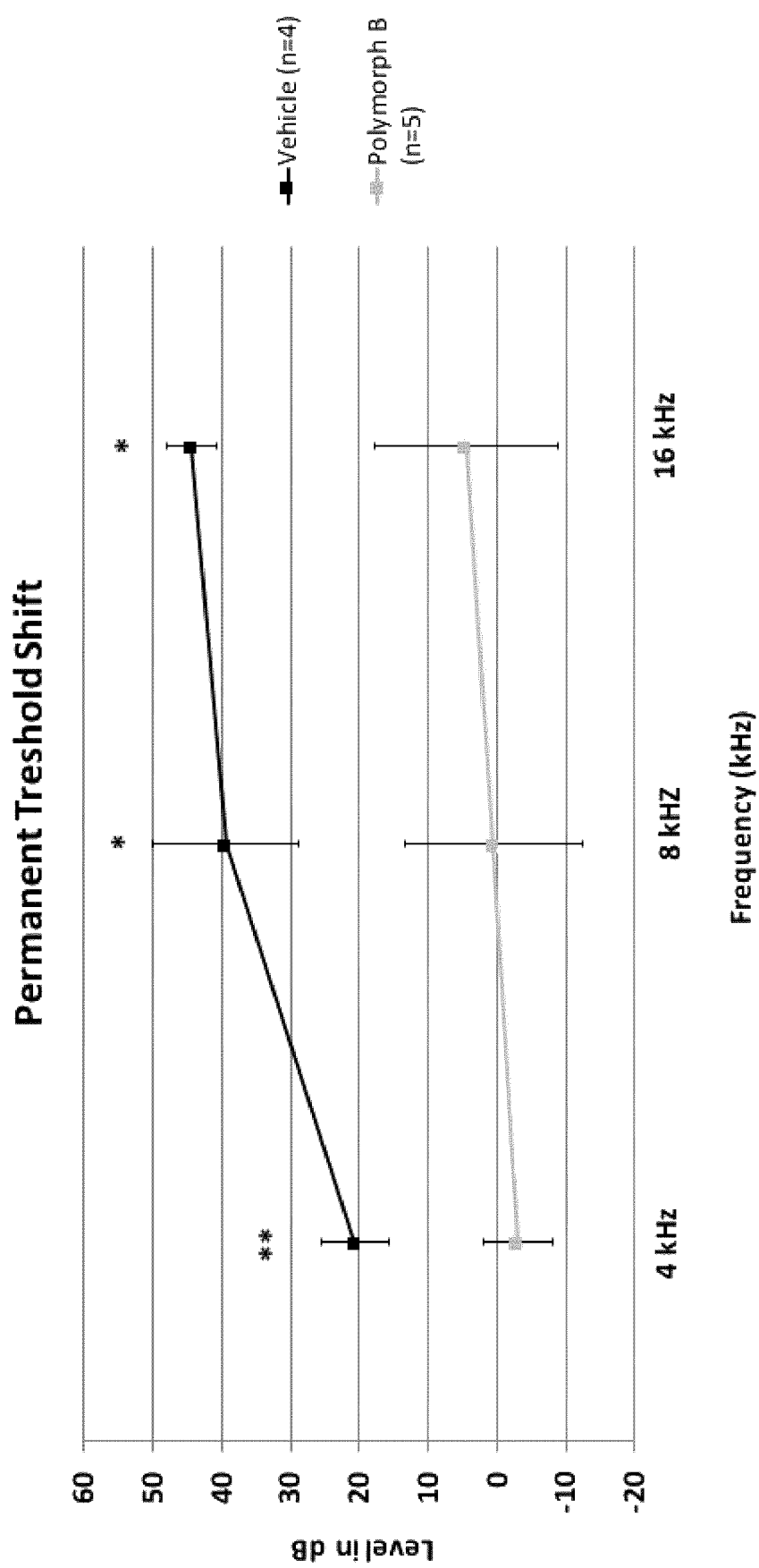

FIG. 14: The effect of a single intratympanic administration of polymorph B of 6-FMC (0.12 mg) on the PTS in guinea pigs.

Figure 15:
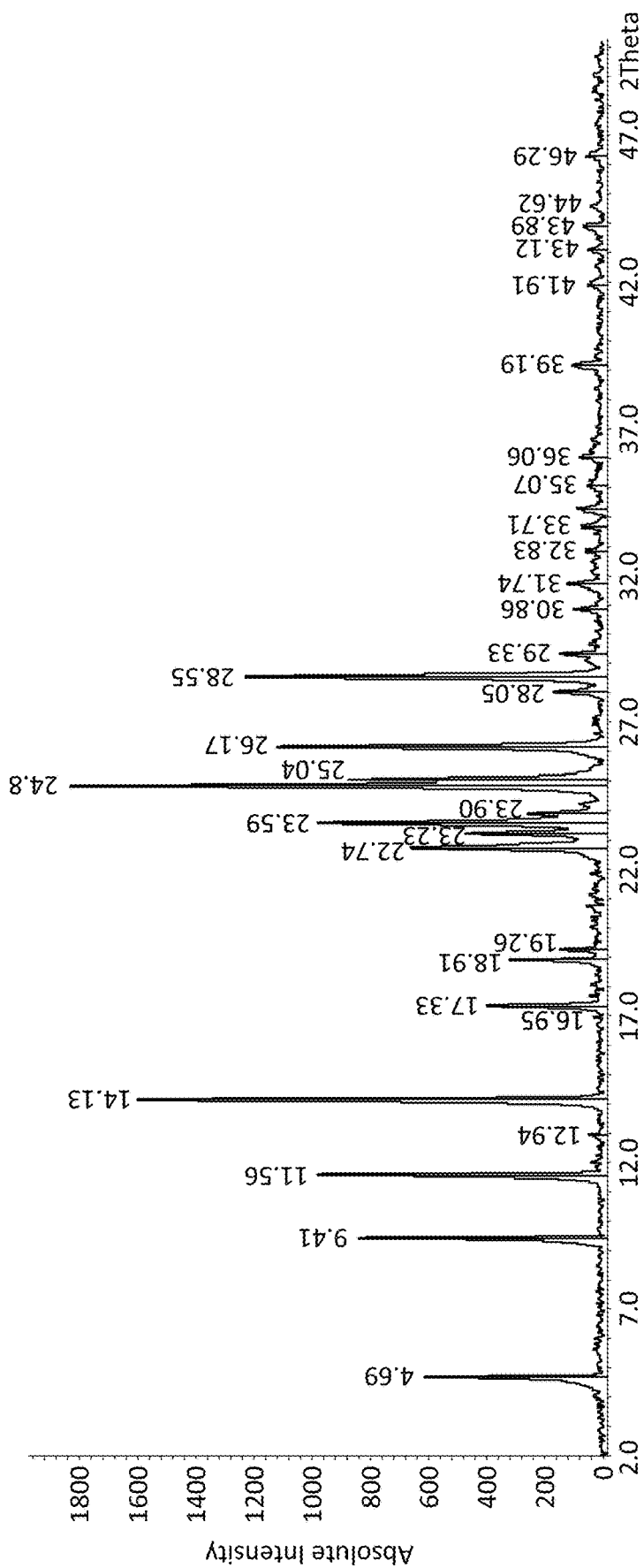

FIG. 15: X-ray powder diffraction (XRPD) of polymorph C.

Figure 16:
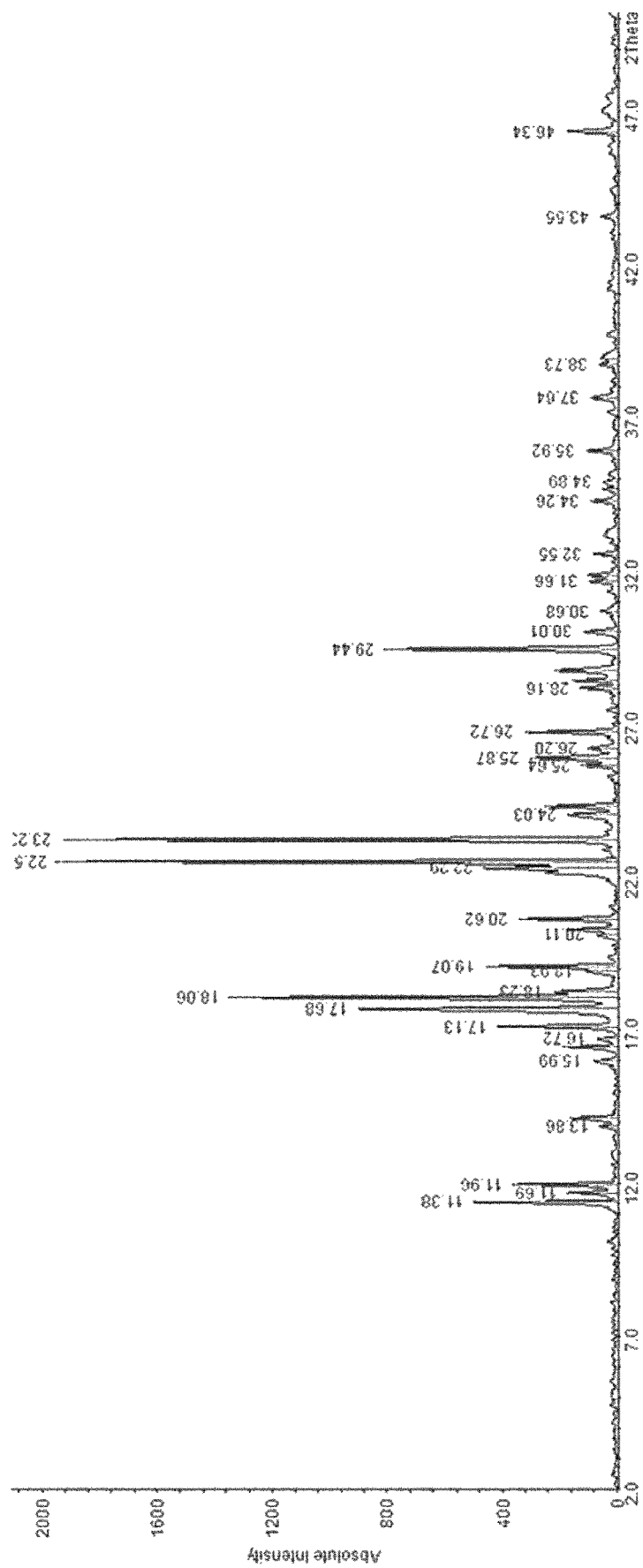

FIG. 16: X-ray powder diffraction (XRPD) of polymorphs B+T.

The following examples are included to demonstrate preferred embodiments of the invention. It should be appreciated by those of skilled in the art that the techniques disclosed in the examples which follow represent techniques discovered by the inventor to function well in the practice of the invention, and thus can be considered to constitute preferred modes for its practice. However, those skilled in the art should, in light of the present disclosure, appreciate that many changes can be made in the specific embodiments which are disclosed and still obtain a like or similar result without departing from the spirit and scope of the invention.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It has to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

EXAMPLES

General Procedures
1. Solid State NMR (ss-NMR)

The ss-NMR was measured at RT with a Bruker Advance III HD, 400 MHz ssMAS (solid state Magic Angle Spinning) with a 4 mm rotor and a spinning rate of 12.5 kHz and a transmitter frequency of 100 MHz. The sample was filled dry in the 4 mm rotor and measured at room temperature.

2. XRPD

XRPD was measured in an open capillary with a STOE Modell Stadi, Detector: Mythen Dectris (Cu-K-a-beam monochromator) from 2 to 50 2-theta Based on the crystallographic data, the respective XRPDs were calculated with the analysis program Mercury® and compared to the experimentally determined XRPDs Sample preparation: The dry samples (approximately 20 mg) were carefully ground in a mortar and a 0.5 mm glass capillary, which is closed by careful melting.

Data collection: XRPD was measured at room temperature with a STOE Modell StudyP, Detector: Mythen Dectris 1K using $Cu_{K\alpha1}$-radiation (1.540598 Å) in transmission geometry, a Cu-long-fine focus X-Ray generator and a curved Germanium monochromator. Samples were measured from 2 to 50 2-theta with the Debye-Scherrer Scan mode. The accuracy of the peak positions is defined as +/−0.2 degrees two theta due to experimental differences like sample preparation and packing density of the capillary.

3. IR

The IR was measured under standard conditions with a Jasco ATR Diamond unit (Golden Gate). First, the background is measured without a sample. Then, a visible amount of the sample is placed on the diamond ATR unit and screwed together. Samples were measured with 16 scans in a range from 4000-400 cm$^{-1}$. The background is subtracted from the actual scan to obtain the IR spectrum of the sample.

Example 1-1: Preparation of Crystalline Polymorphic Form (Polymorph a as Reference Polymorphic Form) of 6-fluoro-9-methyl-β-carboline (6-FMC)

Method A:

6-fluoro-9-methyl-β-carboline (6-FMC) is suspended in n-heptane (50 mL per g) and the suspension is heated under reflux. The resulting solution is allowed to slowly cool to rt and stand overnight. The precipitated solid is filtered, washed with n-heptane and dried. Polymorphic form A of 6-FMC is obtained as pale yellow-brown needles in 88% yield.

WO2015044434 discloses a synthetic method of 6-fluoro-9-methyl-β-carboline (6-FMC) and the 6-FMC is obtained as raw product in forms of mustard-yellow crystals. Said crystals are in the polymorphic form A of the present invention. Elemental analysis of said crystals shows small amounts of impurities, such as water and solvent and such impurities may cause a depressed melting point compared to the highly purified polymorphic form A obtained in this application which appeared as white crystals.

Method B:

1. "State of the art recrystallization". Under magnetic stirring, a suspension of 5 grams of polymorph B in 200 mL of freshly distilled n-heptane were heated to reflux. Care was taken that the heating source (oil bath) did not reach over the solvent level in the 500 mL round bottom flask. Since the crystals completely dissolved in 200 mL, only 20 mL more were added instead of the calculated amount of 290 mL After 5 minutes of refluxing, the heating source was removed and stirring was stopped. The solution was kept away from external agitation or cooling to allow a slow crystal growth of high purity.

After 12 h crystallization at room temperature, the crystals were removed by vacuum filtration, sucked as dry as possible (moving of the lose filter cake with a plastic spatula). The semi-dry product was transferred into a flask and dried for 2 h at 2.5 Pa at room temperature. The dry-yield was 4.52 g (90.4%)

This sample was analyzed with X-ray diffraction and compared to the starting material, which was also re-analyzed to confirm the delivered spectra.

The XRPD of the recrystallization product shows that the crystals are mainly the "polymorph A", but also ~20% of the polymorph B are present; probably because a smaller amount of heptane was used for the recrystallization. The XRPDs before and after the recrystallization are shown in an overlay. To eliminate the remaining polymorph B, the batch was subjected to a further recrystallization process (see part 3).

2. Recrystallization under harsh conditions (too high temperature, too big flask and heating source 1 cm above the solvent level). The equipment was used as in the first experiment. 3.6 g were refluxed in 120 mL of n-heptane in a 500 mL flask: The solution appeared clear, but above the solvent level, continuously crystals formed during the heating process and occasionally were rinsed back into the mixture by the dripping boiling heptane.

This mixture (with some preformed crystals was cooled down and quickly formed crystals in the solution (due to already present crystals). After crystallization was complete, the formed crystals in the flasks looked as if black dots were present and brown smear.

3. Second recrystallization: In a 250 mL flask, a suspension of 3.9 g in 225 mL of heptane was refluxed (metal heating block) and the resulting clear solution was maintained at reflux for 10 min, before the heating source was removed. The reaction was allowed to cool down and as the first crystals appeared, the solution was stirred occasionally to avoid the formation of big crystals. After standing for 3 h, the fluffy crystals were removed by filtration, washed with 15 mL of n-heptane, sucked dry, collected in a smaller flask and dried overnight in a freeze dryer at r.t. with 100 Pa. The resulting crystals appear fluffier and more voluminous than from the first recrystallization. The XRPD shows exclusively the polymorph A.

In a separate experiment we recorded the XRPD of the polymorph B as dry powder and in a capillary soaked with n-heptane to evaluate the influence of free heptane present during the measurement. This is important to make sure that none of the signals detected from the "heptane polymorph" are artifacts due to included residual heptane. It was confirmed that additional heptane has no influence on the recorded XRPDs.

A) X-Ray Powder Crystallography

X-ray powder diffractometry is currently regarded as the definitely method to detect polymorphism. In addition, demonstration of a nonequivalent structure by single crystal X-ray diffraction would corroborate polymorphic structures.

Figure 2:
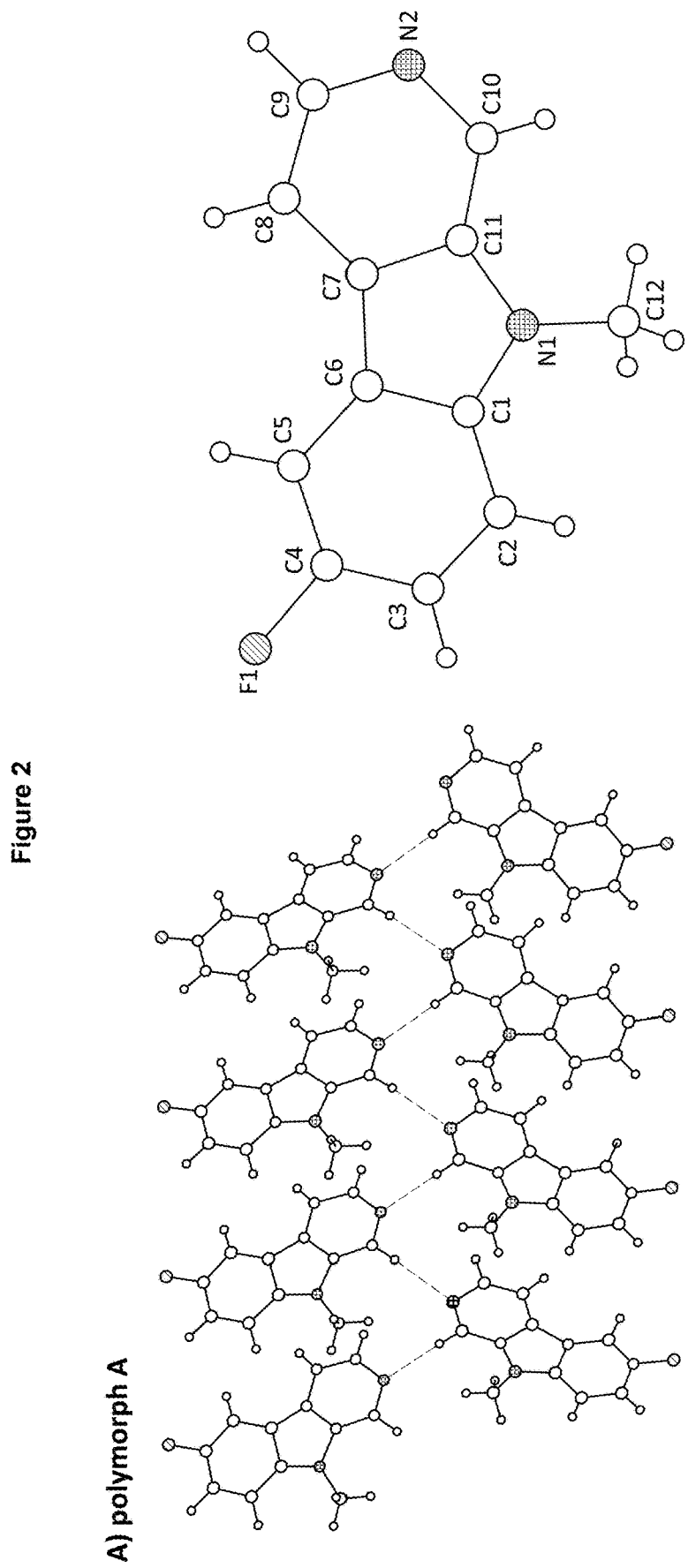

The crystal structure of polymorph A (FIG. 1A) was characterized in some detail by X-ray crystallography. This polymorph crystallizes in an orthorhombic form within a space group $p2_12_12_1$. Unit cell dimensions are a=5.8986 (1) Å, alpha=90°; b=10.3506 (3) Å, beta=90°; c=15.4572 (5) Å, gamma=90°. As shown in FIG. 2A, the 6-FMC molecules are in multidimensional layers of pi-stacked molecules and orthogonal T-stacked molecules. It also shows clearly that there are no hydrates, solvates or salt-based counter ions present in the structure.

TABLE 1

Bond lengths (Å) and angles (° C.) of polymorphic form A

| | | | |
|---|---|---|---|
| F(1)—C(4) | 1.3710(15) | N(1)—C(11) | 1.3795(16) |
| N(1)—C(1) | 1.3818(16) | N(1)—C(12) | 1.4536(17) |
| N(2)—C(10) | 1.3342(18) | N(2)—C(9) | 1.3535(17) |
| C(1)—C(2) | 1.3960(18) | C(1)—C(6) | 1.4179(18) |
| C(2)—C(3) | 1.3877(19) | C(2)—H(2) | 0.946(19) |
| C(3)—C(4) | 1.388(2) | C(3)—H(3) | 0.995(18) |
| C(4)—C(5) | 1.3739(18) | C(5)—C(6) | 1.3991(17) |
| C(5)—H(5) | 0.981(17) | C(6)—C(7) | 1.4404(17) |
| C(7)—C(8) | 1.3985(16) | C(7)—C(11) | 1.4104(17) |
| C(8)—C(9) | 1.3850(17) | C(8)—H(8) | 0.964(18) |
| C(9)—H(9) | 0.957(18) | C(10)—C(11) | 1.3987(18) |
| C(10)—H(10) | 0.998(17) | C(12)—H(12A) | 0.97(2) |
| C(12)—H(12B) | 1.00(2) | C(12)—H(12C) | 0.97(2) |
| C(11)—N(1)—C(1) | 108.03(11) | C(11)—N(1)—C(12) | 126.04(11) |
| C(1)—N(1)—C(12) | 125.63(12) | C(10)—N(2)—C(9) | 118.71(11) |
| N(1)—C(1)—C(2) | 128.84(12) | N(1)—C(1)—C(6) | 109.53(11) |
| C(2)—C(1)—C(6) | 121.63(12) | C(3)—C(2)—C(1) | 117.68(13) |
| C(3)—C(2)—H(2) | 120.9(10) | C(1)—C(2)—H(2) | 121.3(10) |
| C(2)—C(3)—C(4) | 119.63(12) | C(2)—C(3)—H(3) | 120.0(11) |
| C(4)—C(3)—H(3) | 120.4(10) | F(1)—C(4)—C(5) | 118.23(12) |

TABLE 1-continued

Bond lengths (Å) and angles (° C.) of polymorphic form A

| | | | |
|---|---|---|---|
| F(1)—C(4)—C(3) | 117.30(12) | C(5)—C(4)—C(3) | 124.47(12) |
| C(4)—C(5)—C(6) | 116.44(12) | C(4)—C(5)—H(5) | 121.1(10) |
| C(6)—C(5)—H(5) | 122.4(10) | C(5)—C(6)—C(1) | 120.13(12) |
| C(5)—C(6)—C(7) | 133.67(12) | C(1)—C(6)—C(7) | 106.19(11) |
| C(8)—C(7)—C(11) | 118.17(11) | C(8)—C(7)—C(6) | 135.41(12) |
| C(11)—C(7)—C(6) | 106.41(10) | C(9)—C(8)—C(7) | 117.43(12) |
| C(9)—C(8)—H(8) | 118.8(11) | C(7)—C(8)—H(8) | 123.7(11) |
| N(2)—C(9)—C(8) | 124.44(12) | N(2)—C(9)—H(9) | 115.8(10) |
| C(8)—C(9)—H(9) | 119.7(10) | N(2)—C(10)—C(11) | 120.89(12) |
| N(2)—C(10)—H(10) | 116.3(9) | C(11)—C(10)—H(10) | 122.7(10) |
| N(1)—C(11)—C(10) | 129.79(12) | N(1)—C(11)—C(7) | 109.83(11) |
| C(10)—C(11)—C(7) | 120.36(11) | N(1)—C(12)—H(12A) | 110.0(12) |
| N(1)—C(12)—H(12B) | 110.9(12) | H(12A)—C(12)—H(12B) | 104.3(17) |
| N(1)—C(12)—H(12C) | 110.3(13) | H(12A)—C(12)—H(12C) | 114.7(18) |
| H(12B)—C(12)—H(12C) | 106.5(18) | | |

B) X-RPD Data

X-ray powder diffraction of polymorph A has characteristic signals in 2-theta

TABLE 2

2-Theta values of crystalline polymorph A (FIG. 3A)

| Angle (2θ) | Rel. Int. (%) |
|---|---|
| 11.9 | 69 |
| 13.8 | 11 |
| 16.5 | 38 |
| 20.0 | 12 |
| 22.4 | 46 |
| 23.8 | 13 |
| 24.0 | 49 |
| 25.6 | 35 |
| 26.2 | 16 |
| 26.7 | 100 |
| 28.1 | 38 |
| 29.9 | 4.5 |

C) ssNMR of Polymorph A (FIG. 8A)

28.7, 103.6, 111.9, 113.4, 114.6, 114.8, 118.9, 125.4, 131.0, 134.0, 135.8, 155.5, 155.7, 156.4, 156.6, 157.6, 158.2, and 159.3 ppm D) FT-IR of Polymorph A (FIG. 4A)

422.64, 446.61, 523.52, 557.49, 604.03, 635.82, 702.67, 743.66, 802.11, 813.34, 848.24, 893.14, 1023.95, 1069.75, 1152.14, 1183.22, 1275.15, 1363.80, 1427.67, 1450.25, 1480.13, 1560.90, and 1582.19 cm$^{-1}$.

Example 1-2: Preparation of Crystalline Polymorphic Form (Polymorph B) of 6-fluoro-9-methyl-β-carboline (6-FMC) According to the Present Invention Method A (Isopropanol:n-Heptane=1:5):

1 g of 6-fluoro-9-methyl-β-carboline (6-FMC) is suspended in a mixture of isopropanol and n-heptane and the suspension is heated under reflux. The resulting solution is cooled and precipitated solids are filtered, washed with n-heptane and dried. Polymorphic form B of 6-FMC is obtained as pale yellow-brown powder in 77% yield.

Method B (Dichloromethane:n-Heptane=1:4):

2 g of 6-fluoro-9-methyl-β-carboline (6-FMC) is dissolved in 6 mL of DCM and 24 mL of n-heptane is added into the solution. Precipitated solids are filtered, washed with n-heptane and dried. Polymorphic form B of 6-FMC is obtained as pale yellow-brown powder in 62% yield.

Method C (Dichloromethane:MTBE=1:9.4):

400 mg of 6-fluoro-9-methyl-β-carboline (6-FMC) is dissolved in 1.6 mL of DCM and 15 mL of MTBE is added into the solution. The resulting suspension is concentrated by rotary evaporator at 40° C. under 65 kPa until a clear solution is obtained. After 2 min, the evaporation is stopped, the solution is cooled, and the resulting suspension is filtered. The rough crystalline polymorphic form B of 6-FMC is obtained as pale brown solid and dried. Yield=75%.

Method D (Acetone:MTBE=1:2.8):

400 mg of 6-fluoro-9-methyl-β-carboline (6-FMC) is dissolved in 3.6 mL of acetone and 10 mL of MTBE is added into the solution. The resulting solution is concentrated by rotary evaporator at 40° C. under 45 kPa until a clear solution is obtained. After 7 min, the resulting suspension is cooled and filtered. The rough crystalline polymorphic form B of 6-FMC is obtained as pale brown solid and dried. Yield=61%.

Method E (Precipitation of the Free Base with Water)

200 mg of 6-fluoro-9-methyl-β-carboline (6-FMC) is dissolved in 3.2 mL of DMSO. The clear solution is precipitated in 40 mL of distilled water and the formed precipitation is centrifuged down. The supernatant is discarded and the precipitation is washed 3× with distilled water to remove residual DMSO. (Vortex—centrifuge-process). After the last washing step, the bright white solids are frozen in liquid nitrogen, lyophilized and represent pure polymorph B.

Method F (Precipitation of the Free Base with NaOH)

An aqueous suspension of 200 mg of 6-fluoro-9-methyl-β-carboline (6-FMC) is stirred and HCl is added to pH 2. During the salt formation, a clear, yellow solution is obtained. To assure the absence of any solids, it is filtered through a 0.45 μm syringe filter. The solution is stirred again and basified with NaOH ad pH 12. During the addition, a thick white precipitation of the free base is observed and centrifuged down. The supernatant is decanted off and the solid washed thoroughly by repeated treatment with distilled water, vortexing and centrifuging processes (4×). After the final wash, the solid is frozen in liquid nitrogen and lyophilized. Yield: 85% of pure polymorph B.

A) X-Ray Crystallography

The crystal structure of polymorph B (FIG. 1B) was characterized in some detail by X-ray crystallography as well. This polymorph crystallizes in a monoclinic form within a space group p2$_1$c. Unit cell dimensions are a=3.8456 (2) Å, alpha=90°; b=17.3249 (8) Å, beta=91.069 (3°); c=13.7709 (7) Å, gamma=90°. As shown in FIG. 2B), the 6-FMC molecules are in ordered layers of zig-zag bands.

It also shows clearly that there are no hydrates, solvates or salt-based counter ions present in the structure. The analysis revealed absence of any solvent. The picture of the formula confirmed the identity of the compound as claimed.

D) FT-IR of Polymorph B (FIG. 4B)

426.62, 524.31, 558.12, 604.22, 636.09, 704.73, 729.05, 742.59, 803.27, 819.54, 852.30, 864.13, 893.22, 1024.99, 1126.71, 1148.77, 1183.98, 1272.31, 1283.82, 1333.10, 1362.06, 1426.98, 1448.53, 1481.82, 1554.80, and 1578.94 $cm^{-1}$.

TABLE 3

Bond lengths (Å) and gales (° C.) of polymorphic form B

| | | | |
|---|---|---|---|
| F(1)—C(4) | 1.360(8) | N(1)—C(11) | 1.376(9) |
| N(1)—C(1) | 1.384(9) | N(1)—C(12) | 1.457(8) |
| N(2)—C(9) | 1.342(10) | N(2)—C(10) | 1.344(10) |
| C(1)—C(2) | 1.398(10) | C(1)—C(6) | 1.408(10) |
| C(2)—C(3) | 1.388(11) | C(2)—H(2A) | 0.9500 |
| C(3)—C(4) | 1.384(11) | C(3)—H(3A) | 0.9500 |
| C(4)—C(5) | 1.355(10) | C(5)—C(6) | 1.401(10) |
| C(5)—H(5A) | 0.9500 | C(6)—C(7) | 1.433(10) |
| C(7)—C(8) | 1.384(10) | C(7)—C(11) | 1.413(9) |
| C(8)—C(9) | 1.393(10) | C(8)—H(8A) | 0.9500 |
| C(9)—H(9A) | 0.9500 | C(10)—C(11) | 1.395(10) |
| C(10)—H(10A) | 0.9500 | C(12)—H(12A) | 0.9800 |
| C(12)—H(12B) | 0.9800 | C(12)—H(12C) | 0.9800 |
| C(11)—N(1)—C(1) | 108.3(5) | C(11)—N(1)—C(12) | 126.1(6) |
| C(1)—N(1)—C(12) | 125.6(6) | C(9)—N(2)—C(10) | 117.9(6) |
| N(1)—C(1)—C(2) | 128.2(6) | N(1)—C(1)—C(6) | 109.5(6) |
| C(2)—C(1)—C(6) | 122.4(7) | C(3)—C(2)—C(1) | 116.5(7) |
| C(3)—C(2)—H(2A) | 121.8 | C(1)—C(2)—H(2A) | 121.8 |
| C(4)—C(3)—C(2) | 120.7(7) | C(4)—C(3)—H(3A) | 119.6 |
| C(2)—C(3)—H(3A) | 119.6 | C(5)—C(4)—F(1) | 118.5(7) |
| C(5)—C(4)—C(3) | 123.6(7) | F(1)—C(4)—C(3) | 117.9(7) |
| C(4)—C(5)—C(6) | 117.5(7) | C(4)—C(5)—H(5A) | 121.2 |
| C(6)—C(5)—H(5A) | 121.2 | C(5)—C(6)—C(1) | 119.4(6) |
| C(5)—C(6)—C(7) | 134.4(7) | C(1)—C(6)—C(7) | 106.3(6) |
| C(8)—C(7)—C(11) | 118.0(6) | C(8)—C(7)—C(6) | 135.1(6) |
| C(11)—C(7)—C(6) | 106.9(6) | C(7)—C(8)—C(9) | 117.6(7) |
| C(7)—C(8)—H(8A) | 121.2 | C(9)—C(8)—H(8A) | 121.2 |
| N(2)—C(9)—C(8) | 125.0(7) | N(2)—C(9)—H(9A) | 117.5 |
| C(8)—C(9)—H(9A) | 117.5 | N(2)—C(10)—C(11) | 121.1(7) |
| N(2)—C(10)—H(10A) | 119.4 | C(11)—C(10)—H(10A) | 119.4 |
| N(1)—C(11)—C(10) | 130.5(7) | N(1)—C(11)—C(7) | 109.1(6) |
| C(10)—C(11)—C(7) | 120.4(7) | N(1)—C(12)—H(12A) | 109.5 |
| N(1)—C(12)—H(12B) | 109.5 | H(12A)—C(12)—H(12B) | 109.5 |
| N(1)—C(12)—H(12C) | 109.5 | H(12A)—C(12)—H(12C) | 109.5 |
| H(12B)—C(12)—H(12C) | 109.5 | | |

B) XRPD

The calculated XRPD pattern from polymorph B and the measured XRPD pattern of polymorph B are shown in FIG. 3B and as an overlay in FIG. 3C. Despite a slight variation in the absolute 2-theta values, the patterns are relative to each other nearly identical.

TABLE 4

2-Theta values of crystalline polymorph B (FIG. 3B)

| Angle (2θ) | Rel. Int. (%) |
|---|---|
| 11.3 | 31 |
| 14.1 | 8 |
| 17.1 | 20 |
| 17.6 | 47 |
| 18.0 | 62 |
| 19.0 | 21 |
| 20.3 | 8 |
| 20.6 | 14 |
| 22.5 | 100 |
| 23.2 | 94 |
| 24.3 | 12 |
| 25.8 | 13 |
| 29.4 | 38 |

C) ssNMR of Polymorph B (FIG. 8B)

28.6, 107.3, 110.2, 111.6, 112.8, 116.6, 121.5, 126.2, 138.0, 155.5, 156.1, 156.7, 157.1, 157.2, 157.7, 158.1, and 158.4 ppm Example 2: DSC & Melting Points Measurement of Crystalline Polymorphic Forms Powders of the polymorphs of 6-FMC were heated up under stirring whereby the heating was slowed at temperatures higher than 100° C. (1 centigrade per minute). Polymorph A sample melted at ~125° C. The heating and cooling curves were recorded by differential scanning calorimetry (DSC; Netzsch DSC 204 F1) (FIG. 5A). The melting point was confirmed by DSC heating. The cooling curve demonstrated a broad range between 65 and 45° C. (FIG. 6A).

The polymorph B sample melted at ~123° C. Analysis of the DSC heating curve demonstrated a transition phase, characterized by a small slowdown of the melting process (FIG. 5B). During the cooling process of polymorph B, the curve showed a biphasic transition in a temperature range of 45-75° C. (FIG. 6B). This reflects down-grading of polymorph B. Diffractometry analysis revealed that the conversion of polymorph B into polymorph A correlated with the duration of the melting status up to a complete conversion. Vacuum sublimation yielded a complete conversion into polymorph A.

Example 3: Polymorph Conversion Under Various Thermal Conditions (Polymorph B to Polymorph A)

3-1: Polymorph B of 6-FMC was dissolved in n-heptane, the suspension was heated (100° C.) for 1:45 h under stirring. Then the suspension was cooled and stirred at room temperature for 15 hrs. The precipitate was filtered, washed with n-heptane and dried by air. The resulting XRPD spectrum did not reveal conversion into form A.

3-2: Polymorph B of 6-FMC was diluted in toluene and heated up to 95° C. and cooled down to room temperature. The precipitate was filtered, washed with toluene and dried in an air stream. The XRPD spectrum indicated some presence of polymorph A, but this experiment was not reproducible so that it is assumed that also under these conditions no conversion of polymorph B to polymorph A takes place.

3-3: A suspension of polymorph B of 6-FMC was diluted in n-heptane and heated up to 110° C. It was kept for 5 hrs 18 min in a flask under reflux conditions, followed by gentle cooling down to room temperature, stirred for 16 hrs. The precipitate was filtered, washed with heptane and dried by air. The XRPD proved unchanged polymorph B.

3-4: A suspension of polymorph B of 6-FMC was diluted in n-heptane and heated up to 108° C. until the substance was completely diluted. Seed crystals of polymorph A were added to the solution which was gentle cooled down to room temperature. The precipitate was filtered, washed with n-heptane and dried by air. The XRPD proved unchanged polymorph B.

Example 4: Polymorph Conversion Using Supercritical $CO_2$ (Polymorph B to Polymorph A)

Extraction/polymorph conversion with supercritical $CO_2$ was performed with 500 mg of crude, off-white polymorph B in an ExtrateX Rapid Expansion of a Supercritical Solution (REES) system. The extraction vessel was heated to 60° C. with a pressure of 350 bar. The nozzle was a stainless-steel capillary 5 cm length, inner diameter 0.25 mm at 70° C. The expansion vessel was heated to 40° C. at 1-5 Mpa. Equilibration time: 2.5 h; spraying-time: 15 min. After the process, polymorph A is obtained as a bright white powder.

The cylinder of the apparatus in which the supercritical $CO_2$ had been introduced was loaded with polymorph B (FIG. 9A) and heated to 60° C. and a pressure of 35 MPa. The time amounted to 2.5 hrs during which the API dissolved completely in the supercritical $CO_2$. The spectrum of the final product is shown in FIG. 9B. It is quite obvious that a transformation happened of polymorph B into polymorph A. The powder was white (FIG. 9C).

Example 5: Properties of Polymorphisms of 6-FMC in Powder Form (Melting and Cooling Experiments)

Powders of the polymorphs of 6-FMC were heated up under stirring whereby the heating was slowed at temperatures higher than 100° C. (1 centigrade per minute). Polymorph A sample melted at ~125° C. The heating and cooling curves were recorded by differential scanning calorimetry (DSC; Netzsch DSC 204 F1) (FIG. 5A). The melting point was confirmed by DSC heating. The cooling curve demonstrated a broad range between 65° C. and 45° C. (FIG. 6A).

The polymorph B sample melted at ~123° C. Analysis of the DSC heating curve demonstrated a transition phase, characterized by a small slowdown of the melting process (FIG. 5B). During the cooling process polymorph B, the curve showed a biphasic transition in a temperature range of 45° C.-75° C. (FIG. 6B). This reflects down-grading of polymorph B. Diffractometry analysis revealed that the conversion of polymorph B into polymorph A correlated with the duration of the melting status up to a complete conversion. Vacuum sublimation at 1-2 kPa yielded a complete conversion into white crystals of polymorph A.

Example 6: Extraction Protocol for 6-FMC from Poloxamer Based Formulation (Stability Test of Polymorphs A and B in a Formulation)

2 mL of poloxamer based formulation with 12 mg/ml 6-FMC were cooled to 4° C., vortexed and transferred into a 2 mL Eppendorf vial. The cooled vial was centrifuged for 2 min with a table-centrifuge, the supernatant polymer solution was removed with a pipette and discarded. The remaining 6-FMC was resuspended and vortexed with 1.5 mL of ice cold milli-Q water and centrifuged down as described before. The supernatant water was again removed with a pipette and the washing procedure is repeated 3 times (in total 4 washings). Note: Keep the solution cool to facilitate the centrifugation process. After the last washing, the remaining white 6-FMC is cooled with liquid nitrogen and freeze dried overnight at 100 Pa at room temperature.

After 30 hours in formulation 60% of polymorphic form A is converted into polymorphic form B (see FIG. 10). Keeping the formulation for 48 hours or longer results in 100% conversion of polymorphic form A into polymorphic form B as shown in FIG. 11.

Example 7: Preparation of $3^{rd}$ Crystalline Polymorphic Form (Polymorph C) of 6-fluoro-9-methyl-β-carboline (6-FMC)

818 mg 6-FMC (polymorph B) were dissolved in 5 mL ethanol and 500 µL water. Then 50 mL of heptane were added, resulting in phase separation. Despite the phase separation, the rotary evaporator was used at 40° C. and 14 kPa. An oil film on the piston wall separated, which suddenly became firm. This crystalline solid substance was analyzed demonstrating polymorph B only.

A further 20 mL of heptane was added to the reaction product and heated under reflux conditions (temperature about 100° C.) for 5 min at normal pressure until the solution looked clear. The solution was cooled overnight, while stirring, to room temperature. Darker lumps were formed on the piston wall while a homogeneous crystal pulp formed on the bottom of the piston. The homogeneous crystal pulp consisted of polymorph C.

The X-RPD of the polymorphic form C is measured as shown in FIG. 15 and characteristic peaks are summarized in Table 5.

TABLE 5

| 2-Theta values of polymorph C | |
|---|---|
| Angle (2θ) | Rel. Int. (%) |
| 4.7 | 33 |
| 9.4 | 45 |
| 11.5 | 53 |
| 14.1 | 87 |
| 17.3 | 21 |
| 18.9 | 17 |

TABLE 5-continued

| 2-Theta values of polymorph C | |
| --- | --- |
| Angle (2θ) | Rel. Int. (%) |
| 19.2 | 8 |
| 22.7 | 35 |
| 23.2 | 25 |
| 23.6 | 53 |
| 23.9 | 14 |
| 24.8 | 100 |
| 25.0 | 48 |
| 26.1 | 61 |
| 28.5 | 67 |

Example 8: Preparation of $4^{th}$ Crystalline Polymorphic Form (Polymorph T) of 6-fluoro-9-methyl-β-carboline (6-FMC)

250 mg 6-FMC of polymorph B, micronized, were acidified with HCl followed by sonication at 40° C. The cloudy solution was basified with sodium hydroxide to pH 12 which caused a fine, powdery precipitation. The powder was streaked out on a weighing paper for air drying. The resulting XRPD revealed a mixture of a new polymorph and polymorph B. The percentage was ~50 to 50%. The new polymorph was clearly different from polymorphs A, B, and C and denominated polymorph T.

An NMR analysis of polymorph B/T mixture, extra-dry polymorphs B/T mixture and pure polymorph B was conducted to check for the presence of water. None of the samples showed more water than present in the deuterated chloroform. Therefore, the analyses did not reveal any evidence for hydrates.

The X-RPD of the polymorphic form T is measured as shown in FIG. 16 and characteristic peaks are summarized in Table 6.

TABLE 6

| 2-Theta values of polymorph T obtained by subtraction of a mixed spectrum of polymorph B and T | |
| --- | --- |
| Angle (2θ) | Rel. Int. (%) |
| 9.4 | 4 |
| 15.7 | 4 |
| 15.9 | 7 |
| 17.4 | 8 |
| 19.4 | 7 |
| 22.1 | 56 |
| 22.3 | 100 |
| 13.9 | 22 |
| 24.9 | 4 |
| 26.2 | 13 |

Example 9: In Vivo Efficacy of Inventive Crystalline Polymorphic Form of 6-FMC—Guinea Pig Model General procedures: All in vivo proof of principle studies were performed in the well-established guinea pig model of NIHL. The guinea pig was chosen because the anatomy is comparable in both structure and size to that of humans. Hearing function was assessed by brain evoked response audiometry (BERA).

Methods: Adult guinea pigs received an intratympanic (i.t.) injection of either 6-FMC formulated in a thermosensitive hydrogel or hydrogel alone. All procedures were performed under anesthesia. BERA was used to measure auditory brainstem responses (ABRs) on day −3 and day 14. The auditory stimuli were sinus tones (10 ms duration at 4, 8, 16 kHz) at 5 dB steps from 0-90 dB. These measurements were used to calculate the PTS. The acoustic trauma was performed on day 0 and consisted of a single continuous band (quarter-octave centered at 8 kHz) at 118 dB SPL for 30 min. Animals were treated 1 h after the end of the acoustic exposure. The round window was visualized under a surgical microscope via a small hole drilled in the bone of the bulla of the left ear. 10 μL of gel containing either 6-FMC or vehicle was injected using a Hamilton syringe and a motorized pump onto the round window membrane (RWM) before the hole was closed with dental cement.

Formulation preparation: a non-ionic tenside based solution is prepared in advance, by dissolving an appropriate amount of the non-ionic tenside in water or in PBS buffer and allowing for an overnight mixing under refrigerated conditions. Once the non-ionic tenside is completely dissolved, osmolality and pH are adjusted if desired. Next the solution is filtered through a 500 μm sieve to remove undissolved gel particles. This concludes compounding of the vehicle. API (Active Pharmaceutical Ingredient) containing formulation is prepared by addition of micronized 6-FMC (≤50 μm) at a concentration of 12 mg/mL. For experiments presented in FIG. 13, 6-FMC formulation was applied directly after being prepared. For experiments in FIG. 14, 6-FMC formulation was prepared at least 48 h prior to animal experiments.

Results and Discussion

An intratympanic treatment with 6-FMC in either polymorphic form A or B resulted in a substantial reduction in NIHL (FIGS. 13 and 14).

Administration of Polymorph A

For polymorphic form A a moderate effect could be achieved, where the PTS was reduced by an average of 7.7 dB (FIG. 13). Overall, the noise exposure led to an average PTS of 22.3 dB in the vehicle-treated controls and this was reduced by about 7.7 dB to a 14.6 dB threshold shift in animals treated with polymorphic form A of the 6-FMC.

For polymorphic form B this effect was considerably stronger and significant across all investigated frequencies and resulted in a therapeutically useful reduction of PTS by at least 23.6 dB up to a remarkable 39.9 dB (FIG. 14). Importantly, at some frequencies the PTS was reduced to 0, which demonstrates that treatment with polymorph B of 6-FMC has the potential of complete recovery from noise induced hearing loss. Overall the noise exposure led to an average PTS of 34.7 dB in the vehicle treated controls and this was significantly reduced by an average of 34.1 dB to a 0.6 dB threshold shift in animals treated with polymorphic form B of the 6-FMC.

Comparison of the efficacy data from the animal studies in which polymorphic form A and B of 6-FMC were used, demonstrates that polymorphic form B has a far superior efficacy over polymorphic form A. The use of polymorphic form B leads to an average PTS reduction of 34.1 dB compared to an average 7.7 dB reduction as observed in animals treated with polymorphic form A. Moreover, it was demonstrated that animals treated with polymorphic form B have the potential for a complete recovery from noise induced hearing loss, as seen in the 4 and 8 kHz frequency in FIG. 14, where the PTS reached 0. Taken together the results from the in vivo studies using the NIHL model in guinea pigs, suggest that a single intratympanic application of polymorphic form B of 6-FMC leads to significant improvement of the PTS and has a superior efficacy over polymorphic form A.

The invention claimed is:

1. A crystalline polymorphic form of 6-fluoro-9-methyl-9H-B-carboline of the formula (I)

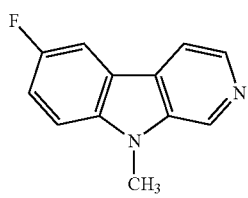

(I)

wherein the crystalline polymorphic form has the X-ray powder diffraction pattern comprising 2-theta angle values of 11.3, 17.1, 17.6, 18.0, 22.5, 23.2, and 29.4 degrees with a deviation ±0.2 degree.

2. The crystalline polymorphic form according to claim 1, wherein
the crystalline polymorphic form has the X-ray powder diffraction pattern comprising 2-theta angle values of 11.3, 14.1, 17.1, 17.6, 18.0, 19.0, 20.3, 20.6, 22.5, 23.2, 24.3, 25.8, and 29.4 degrees with a deviation ±0.2 degree.

3. The crystalline polymorphic form according to claim 1, wherein the crystalline polymorphic form is in a monoclinic form having a space group of $p2_{1/C}$, wherein one molecule of 6-fluoro-9-methyl-9H-B-carboline is in an asymmetric unit cell having unit cell dimension of a=3.85±0.1 Å, b=17.32±0.1 Å, c=13.77±0.1 Å, α=90±3°, β=91±3° and γ=90±3°.

4. The crystalline polymorphic form according to claim 1, wherein solid state $^{13}C$ NMR spectrum of said crystalline polymorphic form comprises peaks at 28.6, 107.3, 110.2, 111.6, 112.8, 116.6, 121.5, 126.2, 138.0, 155.5, 156.1, 156.7, 157.1, 157.2, 157.7, 158.1, and 158.4 ppm with a deviation of ±1 ppm.

5. The crystalline polymorphic form according to claim 1, wherein said crystalline polymorphic form has a melting point of 123° C.±1° C.

6. The crystalline polymorphic form according to claim 1, wherein the particle size of the crystalline polymorphic form is ≤200 µm.

7. The crystalline polymorphic form according to claim 6, wherein the particle size of the crystalline polymorphic form is ≤20 µm.

8. A pharmaceutical composition comprising the crystalline polymorphic form of 6-fluoro-9-methyl-9H-β-carboline according to claim 1 together with at least one pharmaceutically acceptable carrier, excipient, solvent and/or diluent.

9. The pharmaceutical composition according to claim 8, in form of liposomes, ointments, suspensions, gels and emulsions.

10. A method for the treatment of hearing damage, vertigo or a vestibular disorder comprising administering a crystalline polymorphic form of 6-fluoro-9-methyl-9H-β-carboline according to claim 1.

11. The method according to claim 10, wherein the hearing damage, the vertigo or the vestibular disorder is selected from the group consisting of Menière's disease, sudden sensorineural hearing loss, noise induced hearing loss, age related hearing loss, autoimmune ear disease, tinnitus, acoustic trauma, explosion trauma, labyrinthine deafness, presbycusis, trauma during implantation of inner ear prosthesis, insertion trauma, vertigo due to diseases of the inner ear, and hearing damages due to antibiotics and cytostatics.

12. The method according to claim 10, wherein the crystalline polymorphic form is administered topically and/or locally.

13. A method for preparing the crystalline polymorphic form of 6-fluoro-9-methyl-9H-β-carboline of the formula (I) according to claim 1 comprising:
A1) Providing 6-fluoro-9-methyl-9H-β-carboline of the formula (I)

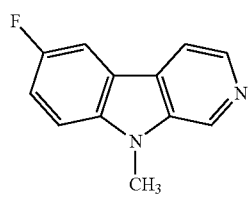

(I)

B1) dissolving 6-fluoro-9-methyl-9H-β-carboline in a mixture of a polar solvent and a non-polar solvent; or dissolving 6-fluoro-9-methyl-9H-β-carboline firstly in a polar solvent and adding a non-polar solvent to the resulting solution of 6-fluoro-9-methyl-9H-β-carboline in the polar solvent,
wherein the polar solvent is dichloromethane, acetone, isopropanol, or a mixture thereof, or a mixture with water and the non-polar solvent is methyl tert-butylether, n-heptane, cyclohexane, or a mixture thereof and the ratio of the polar solvent and the non-polar solvent is in a range of 1:2 to 1:10;
C1) heating the solution or the suspension of 6-fluoro-9-methyl-9H-β-carboline to a temperature in the range between 40° C. to 100° C.;
D1) stirring the resulting solution for at least 10 min at the same temperature;
E1) cooling the resulting solution down to a temperature in the range between −10° C. to +30° C. to obtain the crystalline polymorphic form of 6-fluoro-9-methyl-9H-β-carboline according to claim 1; and
F) separating the crystalline polymorphic form B of 6-fluoro-9-methyl-9H-β-carboline of the formula (I) according to claim 1.

14. The method according to claim 13, wherein in step B1) a concentration of 6-fluoro-9-methyl-9H-β-carboline in the mixture of the polar solvent and the non-polar solvent is in the range of 50 mM to 200 mM.

15. The method according to claim 13, wherein after step E1) and before step F) the following step E2) is performed:
E2) seeding the crystalline polymorphic form of 6-fluoro-9-methyl-9H-β-carboline.

16. A method for the treatment of hearing damage, vertigo or a vestibular disorder comprising administering a pharmaceutical composition according to claim 8.

17. The method according to claim 16, wherein the hearing damage, the vertigo or the vestibular disorder is selected from the group consisting of Menière's disease, sudden sensorineural hearing loss, noise induced hearing loss, age related hearing loss, autoimmune ear disease, tinnitus, acoustic trauma, explosion trauma, labyrinthine deafness, presbycusis, trauma during implantation of inner ear prosthesis, insertion trauma, vertigo due to diseases of the inner ear, and hearing damages due to antibiotics and cytostatics.

18. The method according to claim 16, wherein the pharmaceutical composition is administered topically and/or locally.

19. The crystalline polymorphic form according to claim 2, wherein the crystalline polymorphic form is in a monoclinic form having a space group of $p2_{1/c}$, wherein one molecule of 6-fluoro-9-methyl-9H-β-carboline is in an asymmetric unit cell having unit cell dimension of a=3.85±0.1 Å, b=17.32=0.1 Å, c=13.77±0.1 Å, α=90±3°, β=91±3° and γ=90±3°.

20. The method according to claim 14, wherein after step E1) and before step F) the following step E2) is performed:
   E2) seeding the crystalline polymorphic form of 6-fluoro-9-methyl-9H-β-carboline.

\* \* \* \* \*